(12) United States Patent
Pierson et al.

(10) Patent No.: US 6,964,168 B1
(45) Date of Patent: Nov. 15, 2005

(54) ADVANCED HEAT RECOVERY AND ENERGY CONVERSION SYSTEMS FOR POWER GENERATION AND POLLUTION EMISSIONS REDUCTION, AND METHODS OF USING SAME

(75) Inventors: Tom L. Pierson, Sugar Land, TX (US); John David Penton, Pasadena, TX (US)

(73) Assignee: TAS Ltd., Houston, TX (US)

( * ) Notice: Subject to any disclaimer, the term of this patent is extended or adjusted under 35 U.S.C. 154(b) by 0 days.

(21) Appl. No.: 10/616,074

(22) Filed: Jul. 9, 2003

(51) Int. Cl.[7] ............................................. F01K 25/10
(52) U.S. Cl. ........................... 60/670; 60/651; 60/653; 60/671
(58) Field of Search ........................ 60/651, 653, 670, 60/671

(56) References Cited

U.S. PATENT DOCUMENTS

| | | | |
|---|---|---|---|
| 1,632,575 A * | 6/1927 | Abendroth | 60/647 |
| 4,557,112 A * | 12/1985 | Smith | 60/651 |
| 4,586,340 A | 5/1986 | Kalina | 60/673 |
| 4,604,867 A | 8/1986 | Kalina | 60/653 |
| 4,732,005 A | 3/1988 | Kalina | 60/673 |
| 4,899,545 A | 2/1990 | Kalina | 60/673 |
| 5,029,444 A | 7/1991 | Kalina | 60/673 |
| 5,095,708 A | 3/1992 | Kalina | 60/673 |
| 5,440,882 A | 8/1995 | Kalina | 60/641.2 |
| 5,557,936 A | 9/1996 | Drnevich | 60/649 |
| 5,572,871 A | 11/1996 | Kalina | 60/649 |
| 5,754,613 A * | 5/1998 | Hashiguchi et al. | 60/649 |
| 5,953,918 A * | 9/1999 | Kalina et al. | 60/653 |
| 6,058,695 A | 5/2000 | Ranasinghe et al. | 60/39.182 |
| 6,195,997 B1 | 3/2001 | Lewis et al. | 60/648 |
| 6,269,644 B1 | 8/2001 | Erickson et al. | 60/649 |
| 6,318,065 B1 | 11/2001 | Pierson | 60/783 |
| 6,321,552 B1 | 11/2001 | Frederiksen | 62/238.3 |

(Continued)

FOREIGN PATENT DOCUMENTS

JP 53132638 A * 11/1978 ........... F01K 25/10

(Continued)

*Primary Examiner*—Sheldon J Richter
(74) *Attorney, Agent, or Firm*—Williams, Morgan & Amerson, P.C.

(57) ABSTRACT

Disclosed herein are various systems and methods for producing mechanical power from a heat source. In various illustrative examples, the system may include a heat recovery heat exchanger, a turbine, an economizer heat exchanger, a condenser heat exchanger, and a liquid circulating pump, etc. In other embodiments, a desuperheater may be employed. In one illustrative embodiment, the system comprises a first heat exchanger adapted to receive a fluid from a heat source and a working fluid, wherein, when the working fluid is passed through the first heat exchanger, the working fluid is converted to a vapor via heat transfer with the fluid from the heat source, at least one turbine adapted to receive the vapor, and an economizer heat exchanger adapted to receive exhaust vapor from the turbine and the working fluid, wherein a temperature of the working fluid is adapted to be increased via heat transfer with the exhaust vapor from the turbine prior to the introduction of the working fluid into the first heat exchanger. The system further comprises a condenser heat exchanger that is adapted to receive the exhaust vapor from the turbine after the exhaust vapor has passed through the economizer heat exchanger and a cooling fluid, wherein a temperature of the exhaust vapor is reduced via heat transfer with the cooling fluid, and a pump that is adapted to circulate the working fluid to the economizer heat exchanger.

37 Claims, 16 Drawing Sheets

U.S. PATENT DOCUMENTS

| | | |
|---|---|---|
| 6,347,520 B1 | 2/2002 | Ranasinghe et al. .......... 60/649 |
| 6,470,686 B2 | 10/2002 | Pierson ........................ 60/772 |
| 6,571,548 B1 | 6/2003 | Bronicki et al. ......... 60/39.181 |
| 6,581,384 B1 * | 6/2003 | Benson ........................ 60/653 |
| 6,615,585 B2 | 9/2003 | Tsuji ............................ 60/728 |
| 6,857,268 B2 * | 2/2005 | Stinger et al. ................ 60/651 |
| 2002/0017095 A1 | 2/2002 | Pierson ........................ 60/772 |
| 2002/0162330 A1 * | 11/2002 | Shimizu et al. ............... 60/651 |

FOREIGN PATENT DOCUMENTS

| | | | |
|---|---|---|---|
| JP | 59068505 A * | 4/1984 | .......... F01K 25/10 |

* cited by examiner

ADVANCED HEAT RECOVERY AND ENERGY CONVERSION SYSTEMS FOR POWER GENERATION AND POLLUTION EMISSIONS REDUCTION, AND METHODS OF USING SAME

BACKGROUND OF THE INVENTION

1. Field of the Invention

The present invention generally relates to heat recovery for the purpose of electrical or mechanical power generation. Specifically, the present invention is directed to various systems and methods for the conversion of heat of any quality into mechanical or electrical power.

2. Description of the Related Art

In general, there is a constant drive to increase the operating efficiency of power generation systems. By increasing the efficiency of such systems, capital costs may be reduced, more power may be generated and there may be a reduction of possible adverse impacts on the environment, e.g., a reduction in the amount of waste heat that must ultimately be absorbed by the environment. In other industrial processes, an excess amount of heat may be generated as a byproduct of the process. In many cases, such waste heat is normally absorbed by the environment through use of waste heat devices such as cooling towers.

There are several systems employed in various industries to produce useful work from a heat source. Such systems may including the following:

Heat Recovery Steam Generators (HRSG)—Typically, waste heat from gas turbines or other, similar, high quality heat sources is recovered using steam at multiple temperatures and pressures. Multiple operating levels are required because the temperature-enthalpy profile is not linear. That is, such prior art systems involve isothermal (constant temperature) boiling as the working fluid, i.e., water, is converted from a liquid to a vapor state. Various embodiments of the present invention eliminate the need for multiple levels and simplifies the process while having the capability to recover more heat and to economically recover heat from a much lower quality heat source.

Rankine Cycle—The classic Rankine cycle is utilized in conjunction with HRSGs to produce power. This process is complex and requires multiple steam turbines, feed water heaters, steam drums, pumps, etc. The methods and systems of the present invention are significantly less complex while being more effective than systems employing the Rankine cycle.

Organic Rankine Cycle—Similar to the classic Rankine cycle, an Organic Rankine cycle utilizes a low temperature working fluid such as isoButane or isoPentane in place of steam in the classic cycle. The system remains complex and is highly inefficient at low operating temperature differences.

Kalina Cycle—Dr. Kalina's cycle is a next generation enhancement to the Rankine cycle utilizing a binary fluid mixture, typically water and ammonia. Water and ammonia are utilized at different concentrations in various portions of the process to extend the temperature range potential of the cycle and to allow higher efficiencies than are possible in the Rankine cycle. The methods and systems of the present invention simplifies the process while having the capability to recover more heat and to recover heat from a low quality heat source.

The following patents may be descriptive of various aspects of the prior art: U.S. Pat. No., 5,029,444 to Kalina; U.S. Pat. No. 5,440,882 to Kalina; U.S. Pat. No. 5,095,708 to Kalina; U.S. Pat. No. 5,572,871 to Kalina; and U.S. Pat. No. 6,195,997 to Lewis; each of which are hereby incorporated by reference.

In general, what is desired are systems and methods for improving the efficiencies of various power generation systems and systems and methods for utilizing waste heat sources to improve operating efficiencies of various power and industrial systems. The present invention is directed to various systems and methods that may solve, or at least reduce, some or all of the aforementioned problems.

SUMMARY OF THE INVENTION

The present invention is generally directed to various systems and methods for producing mechanical power from a heat source. In various illustrative examples, the devices employed in practicing the present invention may include a heat recovery heat exchanger, a turbine, an economizer heat exchanger, a condenser heat exchanger, and a liquid circulating pump, etc. In one illustrative embodiment, the system comprises a first heat exchanger adapted to receive a fluid from a heat source and a working fluid, wherein, when the working fluid is passed through the first heat exchanger, the working fluid is converted to a vapor via heat transfer from the heat contained in the fluid from the heat source, at least one turbine adapted to receive the vapor, and an economizer heat exchanger adapted to receive exhaust vapor from the turbine and the working fluid, wherein a temperature of the working fluid is adapted to be increased via heat transfer with the exhaust vapor from the turbine prior to the introduction of the working fluid into the first heat exchanger. The system further comprises a condenser heat exchanger that is adapted to receive the exhaust vapor from the turbine after the exhaust vapor has passed through the economizer heat exchanger and a cooling fluid, wherein a temperature of the exhaust vapor is reduced via heat transfer with the cooling fluid, and a pump that is adapted to circulate the working fluid to the economizer heat exchanger.

In another illustrative embodiment, the system comprises a first heat exchanger adapted to receive a fluid from a heat source and a working fluid, wherein, when the working fluid is passed through the first heat exchanger, the working fluid is converted to a vapor via heat transfer from the heat contained in the fluid from the heat source, and at least one turbine adapted to receive the vapor. The system further comprises a desuperheater heat exchanger adapted to receive exhaust vapor from the turbine and a portion of the working fluid extracted upstream of the first heat exchanger, wherein the temperature of the exhaust vapor from the turbine is adapted to be reduced via heat transfer with the working fluid in the desuperheater heat exchanger, a condenser heat exchanger that is adapted to receive working fluid exiting the desuperheater heat exchanger and a cooling fluid, wherein a temperature of the working fluid is adapted to be reduced via heat transfer with the cooling fluid in the condenser heat exchanger, and a pump adapted to circulate the working fluid to the first heat exchanger.

BRIEF DESCRIPTION OF THE DRAWINGS

The invention may be understood by reference to the following description taken in conjunction with the accompanying drawings, in which like reference numerals identify like elements, and in which.

Figure 1A:
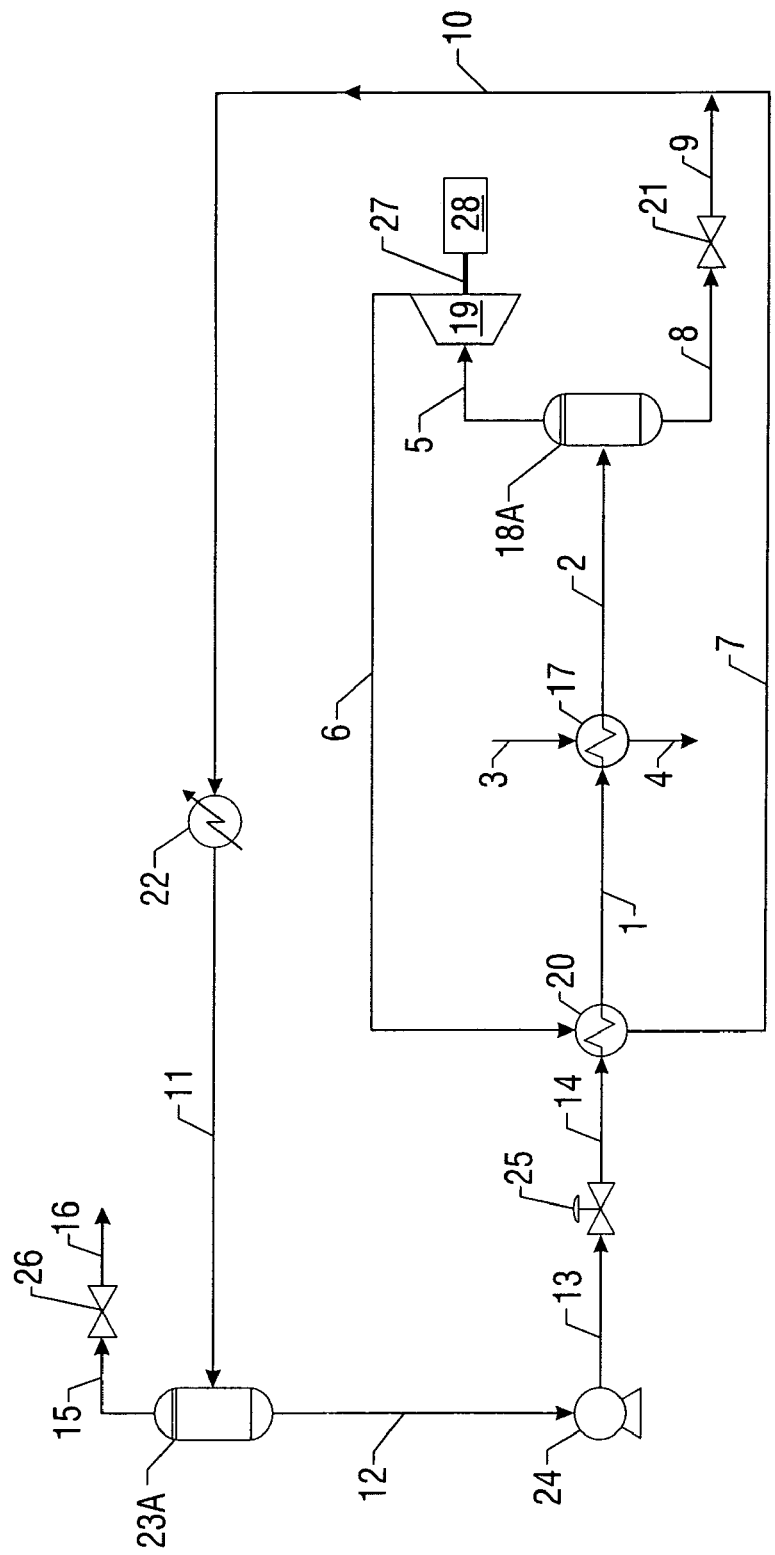
FIG. 1A is a schematic diagram of one illustrative embodiment of the present invention employing an economizer heat exchanger and a heat recovery heat exchanger.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings which are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

One illustrative embodiment of the present invention will now be described with reference to FIG. 1A. As shown therein, a high pressure liquid 1 enters a heat exchanger 17 and exits as a superheated vapor 2 due to heat transfer with a hot fluid, either a gas, a liquid, or a two-phase mixture of gas and liquid entering at 3 and exiting at 4. The vapor 2 may be a subcritical or supercritical vapor. The heat exchanger 17 may be any type of heat exchanger capable of transfer heat from one fluid stream to another fluid stream. For example, the heat exchanger 17 may be a shell-and-tube heat exchanger, a plate-fin-tube coil type of exchanger, a bare tube or finned tube bundle, a welded plate heat exchanger, etc. Thus, the present invention should not be considered as limited to any particular type of heat exchanger unless such limitations are expressly set forth in the appended claims. The source of the hot fluid 3 for the heat exchanger 17 may either be a waste heat source (from any of a variety of sources) or heat may intentionally be supplied to the system, e.g., by a gas burner or the like. In one illustrative embodiment, the source of the hot fluid 3 for the heat exchanger 17 is a waste heat source such as the exhaust from an internal combustion engine (e.g., a reciprocating diesel engine), a combustion gas turbine, a compressor, or an industrial or manufacturing process. However, any heat source of sufficient quantity and temperature may be utilized if it can be obtained economically. In some cases, the heat exchanger 17 may be referred to as a "waste heat recovery heat exchanger," indicating that the source of the fluid 3 is from what would otherwise be a waste heat source, although the present invention is not limited to such situations.

In one embodiment, the vapor 2 is then sent to a suction drum 18 that may contain a demister 18A therein. The suction drum 18 may serve several purposes, such as, for example: (a) preventing liquid from entering the turbine 19; (b) allowing liquid (or even vapor) to be bypassed around the turbine 19; and (c) allowing for startup and shutdown of the system. Any liquid that does collect in the drum 18 will exit through the drain line 8 and be routed through a control valve 21 to reduce it to a pressure equal to the condenser 22 inlet pressure in line 10.

Dry vapor 5 exits the drum 18 and enters the turbine 19. The vapor 5 is expanded in the turbine 19 and the design of the turbine converts kinetic and potential energy of the dry vapor 5 into mechanical energy in the form of torque on an output shaft 27. Any type of commercially available turbine suited for use in the systems described herein may be employed, e.g., an expander, a turbo-expander, a power turbine, etc. The shaft horsepower available on the shaft 27 of the turbine 19 can be used to produce power by driving an illustrative generator 28, or to drive a compressor, a pump, or other mechanical device, either directly or indirectly. Several illustrative embodiments of how such useful power may be used are described further in the application. Additionally, as will be recognized by those skilled in the art after a complete reading of the present application, a plurality of turbines 19 may be employed with the system depicted in FIG. 1A.

The low pressure, high temperature discharge 6 from the turbine is routed to an economizer heat exchanger 20 that is positioned upstream of the heat exchanger 17. The economizer heat exchanger 20 may serve several purposes, such as, for example: (a) the economizer 20 may be used to recover heat from the turbine exhaust 6 and use it to preheat the liquid working fluid 14 prior to the liquid working fluid being introduced into the heat exchanger 17; and (b) the economizer 20 may be used to cool the low pressure, high temperature discharge 6 from the turbine 19 and, thus, reduce the required size and cost of the condenser 22. The condenser 22 condenses the slightly superheated, low pressure gas 10 and condenses it to the liquid state using water, seawater, air, or other process fluids. The condenser 22 may be utilized to condense the hot working fluid from a vapor to a liquid at a temperature ranging from approximately 50–200° F.

The condensed liquid 11 is introduced into a drum 23 that may contain a demister 23A. The drum 23 may serve several purposes, such as, for example: (a) the design of the drum 23 ensures that the pump 24 has sufficient head to avoid cavitation; (b) the design of the drum 23 ensures that the supply of liquid 12 to the pump 24 is steady; (c) the design of the drum 23 ensures that the pump 24 will not be run dry; (d) the design of the drum 18 provides an opportunity to evacuate any non-condensable vapors from the system through a vent valve 26 via lines 15, 16; (e) the design of the drum 23 allows for the introduction of process liquid into the system; and (f) the design of the drum 23 allows for the introduction of makeup liquid in the event that a small amount of operating fluid is lost. The high pressure discharge 13 of the pump is fed to the economizer heat exchanger 20 through the valve 25. The pump 24 may be any type of commercially available pump sufficient to meet the pumping requirements of the systems disclosed herein. In various embodiments, the pump 24 may be sized such that the discharge pressure of the working fluid ranges from approximately 200–800 psia.

In the illustrative embodiment depicted in FIG. 1A, the working fluid enters the heat recovery heat exchanger 17 as a high pressure liquid and leaves as a superheated vapor (stream 2). The high pressure, superheated vapor is then expanded through a turbine 19 to produce mechanical power. The vapor (stream 6) exiting the turbine 19 is at low pressure and in the superheated state. This superheated vapor is then introduced into the economizer heat exchanger 20 to preheat the working fluid going into the heat recovery heat exchanger 17. The economizer heat exchanger 20 significantly enhances the efficiency of the system. The cooled vapor exiting the economizer heat exchanger 20, typically still slightly superheated, is condensed at low pressure using the condenser heat exchanger 22. This condenser heat exchanger 22 may be water cooled, air cooled, evaporatively cooled, or used as a heat source for district heating, domestic hot water, or similar heating load. The condensed low pressure liquid (stream 11) is fed to the suction of a pump 24 and is pumped to the high pressure required for the heat recovery heat exchanger 17.

The present invention may employ a single component working fluid that may be comprised of any of, for example, HCFC-123 (R-123), HCFC-134a (R-134a), ammonia ($NH_3$), etc. Notably, the present invention does not employ water as a working fluid. In some applications, the working fluid may be comprised of multiple components, none of which are water. For example, one or more of the refrigerants identified above may be combined or such refrigerants may be combined with a hydrocarbon fluid, e.g., isobutene, etc. In the context of the present application, reference may be made to the use of R-123 as the working fluid and to provide certain illustrative examples. However, after a complete reading of the present application, those skilled in the art will recognize that the present invention is not limited to any particular type of working fluid or refrigerant. Thus, the present invention should not be considered as limited to any particular working fluid unless such limitations are clearly set forth in the appended claims.

Figure 1B:
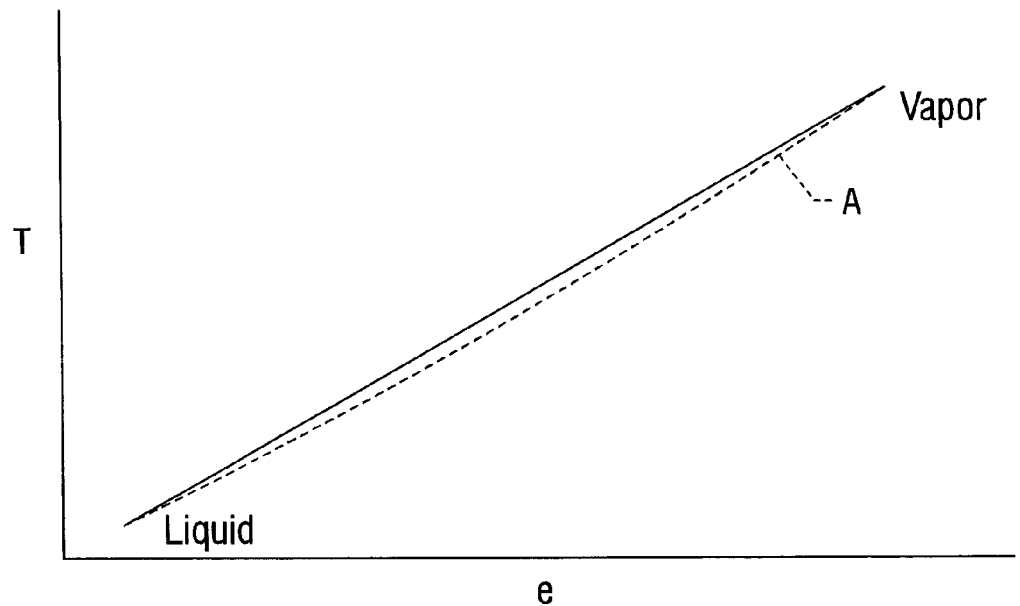
FIGS. 1B and 1C are illustrative temperature-enthalpy plots of a working fluid employed in various systems of the present invention.
Figure 1C:
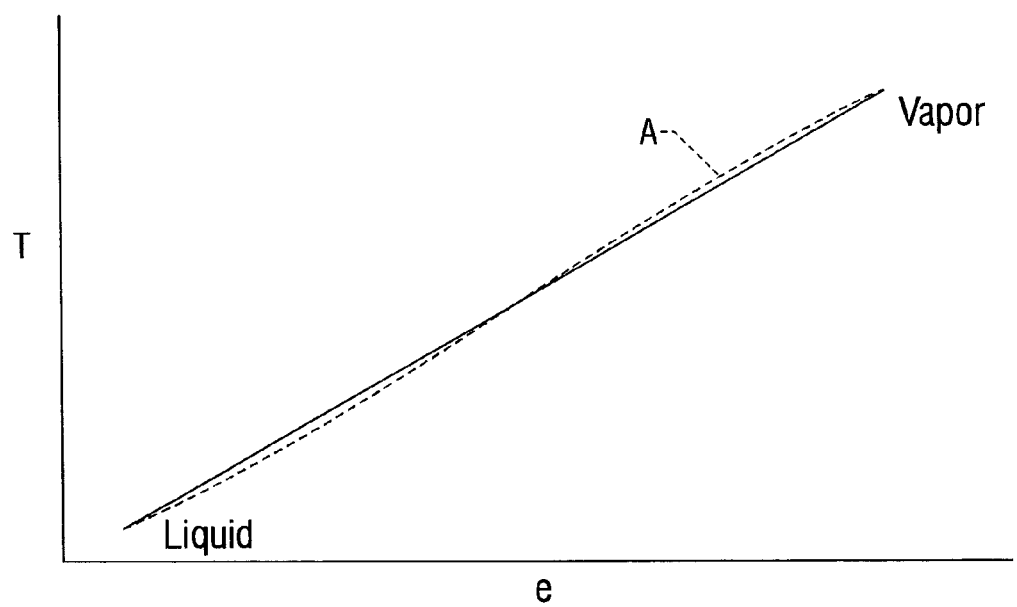

In the present invention, as the working fluid passes through the heat exchanger 17, it changes from a liquid state to a vapor state in a non-isothermal process using an approximately linear temperature-enthalpy profile, i.e., the slope of the temperature-enthalpy curve does not change significantly even though the working fluid changes state from a subcooled liquid to a superheated vapor. This situation is schematically depicted in FIGS. 1B and 1C, which are illustrative temperature-enthalpy graphs from an illustrative working fluid as it passes through the heat exchanger 17. The slope of the temperature-enthalpy graph may vary depending upon the application. Moreover, the temperature-enthalpy profile may not be linear over the entire range of the curve. For example, the temperature-enthalpy graph may be curved as indicated by the dashed line "A" in FIG. 1B. FIG. 1C is another example of an illustrative temperature-enthalpy graph "A" that is slightly curved.

Figure 1D:
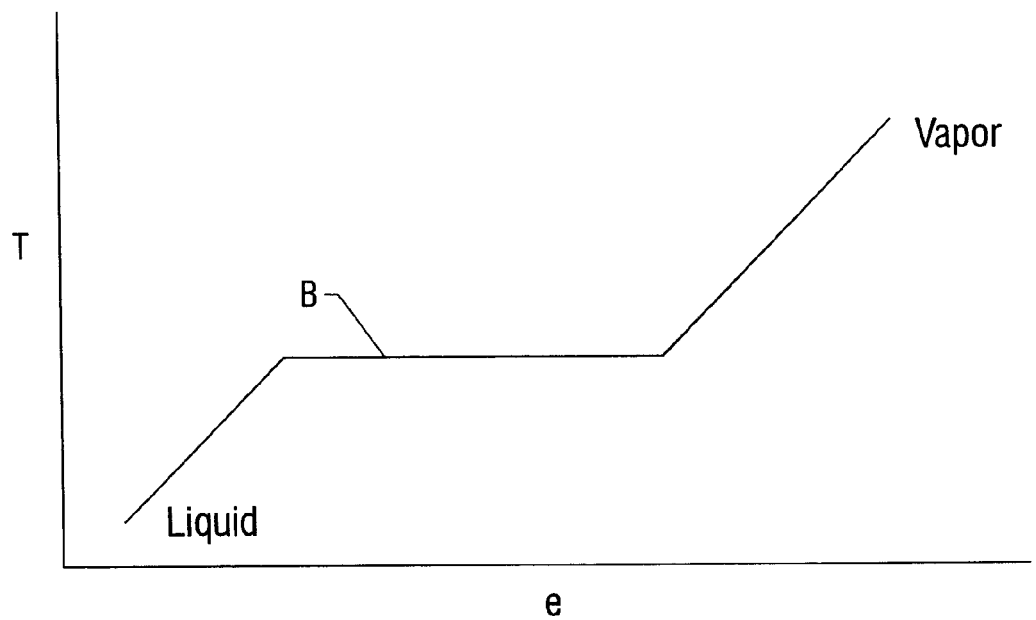
FIG. 1D is a temperature-enthalpy plot of a working fluid employed in an illustrative prior art system.

The temperature-enthalpy profile of the working fluid of the present invention is fundamentally different from other systems. For example, a temperature-enthalpy profile for a typical Rankine cycle is depicted in FIG. 1D. As shown therein, the single working fluid, e.g., water, undergoes an essentially isothermal (constant temperature) boiling process, as indicated by the horizontal line "B," as the working fluid changes from a liquid state to a vapor state. Other systems, such as a Kalina cycle, may exhibit a more non-isothermal conversion of the working fluid from a liquid state to a vapor state, but such systems employ binary component working fluids, such as ammonia and water.

The non-isothermal process used in practicing aspects of the present invention is very beneficial in that it provides a greater heat capacity that may be recaptured when the vapor is cooled back to a liquid. That is, due to the higher temperatures involved in such a non-isothermal process, the working fluid, in the super-heated vapor state, contains much more useable heat energy that may be recaptured and used for a variety of purposes. Further, the nearly linear temperature-enthalpy profile allows the exiting temperature of the (waste) heat source to approach more closely to the working fluid temperature 1 entering the heat exchanger 17.

By way of example, with reference to FIG. 1A, in one illustrative embodiment where the working fluid is R-123, the temperature of the working fluid may be between approximately 50–200° F. at approximately 600 psia at the discharge of the pump 24. The working fluid may be at a pressure of approximately 30 psia at the discharge of the condenser 22 (see FIG. 1A) for a system pressure ratio of approximately twenty to one (20:1). The temperature of the R-123 working fluid at the exit of the heat exchanger 17 may be approximately 200–1000° F. The temperature of the R-123 working fluid at the exit of the turbine 19 may be approximately 200–800° F. at a pressure of approximately 35 psia. The temperature of the R-123 working fluid at the exit of the economizer heat exchanger 20 may be approximately 200–700° F. at a pressure of approximately 600 psia at 1 and approximately 60–250° F. at a pressure of 32 psia at 7.

In another illustrative embodiment where the working fluid is R-134a, the temperature of the working fluid may be between approximately 50–200° F. at approximately 710 psia at the discharge of the pump 24. The working fluid may be at a pressure of approximately 160 psia at the discharge of the condenser 22 (see FIG. 1A) for a system pressure ratio of approximately four point four to one (4.4:1). The temperature of the R-134a working fluid at the exit of the heat exchanger 17 may be approximately 400–800° F. The temperature of the R-134a working fluid at the exit of the turbine 19 may be approximately 300–700° F. at a pressure of approximately 170 psia. The temperature of the R-134a working fluid at the exit of the economizer heat exchanger 20 may be approximately 200–400° F. at a pressure of approximately 705 psia at 1 and approximately 60–250° F. at a pressure of 165 psia at 7.

In yet another illustrative embodiment where the working fluid is ammonia, the temperature of the working fluid may be approximately 100–120° F. in a solar power application at approximately 1700 psia at the discharge of the pump 24. The working fluid may be at a pressure of approximately 220 psia at the discharge of the condenser 22 (see FIG. 1A) for a system pressure ratio of approximately seven point seven to one (7.7:1). The temperature of the ammonia working fluid at the exit of the heat exchanger 17 may be approximately 600–1000° F. The temperature of the ammonia working fluid at the exit of the turbine 19 may be approximately 200–650° F. at a pressure of approximately 220 psia. The temperature of the ammonia working fluid at the exit of the economizer heat exchanger 20 may be approximately 110–250° F. at a pressure of approximately 225 psia.

The methods and systems described herein are effective for pressure ratios greater than three to one (3:1) and the pressure ratio is determined by the physical characteristics of the working fluid being utilized. The specific selection of the low cycle pressure is determined by the condensing pressure of the working fluid and will be, typically, the saturation pressure of the working fluid at between approximately 60° F. and 160° F., depending on the cooling medium or condenser heat exchanger type and the ambient temperature or ultimate heat sink temperature. The specific selection of the high cycle pressure is determined by the thermodynamic properties of the working fluid plus a margin, as a minimum, and by cycle efficiency, pump power consumption, and maximum component design pressures as a maximum.

Figure 2:
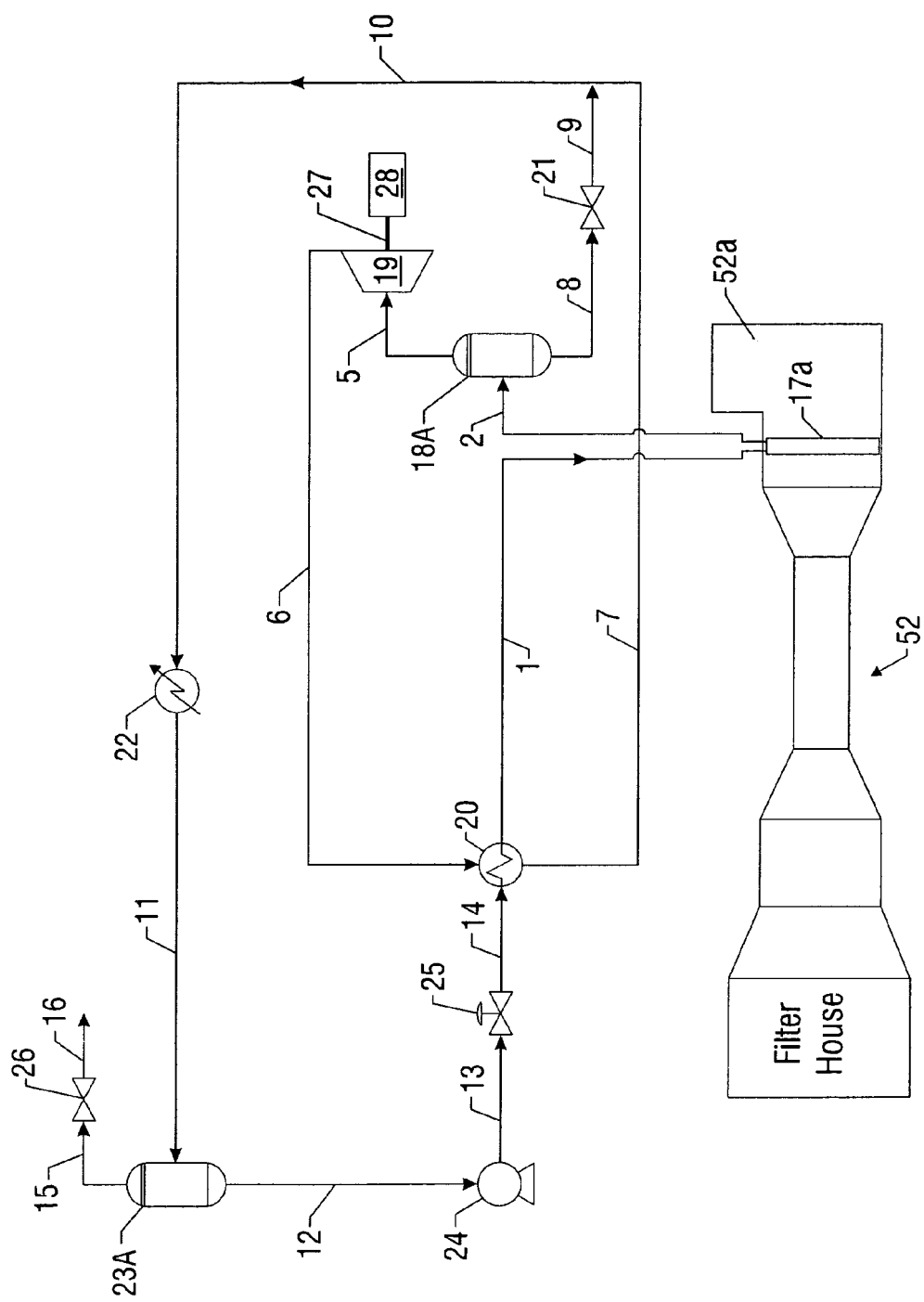
FIG. 2 is a schematic diagram of one illustrative embodiment of the present invention employed in connection with a gas turbine.

In another illustrative embodiment of the present invention, as shown in FIG. 2, a system substantially similar to FIG. 1A is utilized in conjunction with a combustion gas turbine 4. A gas turbine 52 is a very suitable device for heat recovery as a significant amount (approximately 65–85%) of the fuel burned to produce power leaves the exhaust section 52a of the turbine 52 as waste heat. As will be recognized by those skilled in the art after a complete reading of the present application, any of a variety of commercially available gas turbines may be employed with the present invention. In this illustrative embodiment, a schematically depicted stainless steel plate-fin-tube coil 17A is utilized as the heat exchanger 17 (shown in FIG. 1A) as it has a large surface area to volume ratio, a low air side pressure drop (1–2 inches of water) and a sufficiently high pressure retaining capability. The exhaust of the gas turbine 52 is typically between approximately 800° F. and 1200° F. and is, therefore, an ideal source of high quality waste heat. In accordance with one embodiment of the present invention, approximately ten to thirty percent (10–30%) of the available energy in the turbine exhaust is converted into useable power. The overall simple cycle thermal efficiency of the gas turbine 52 is typically in the range of 15–35% with higher numbers being more common in power production applications. For a gas turbine with a thirty percent (30%) thermal efficiency and fifteen percent (15%) waste heat conversion efficiency, the total efficiency increase from thirty percent (30%) to 30%+15%*( 100%–30%)=40.5%. Thus, a typical efficiency gain of 35% (40.5/30) more power can be produced. In other embodiments for other gas turbines, the recovery efficiency can range from ten (10%) to more than eighty percent (80%) with equivalent gains in overall efficiency.

Figure 3:
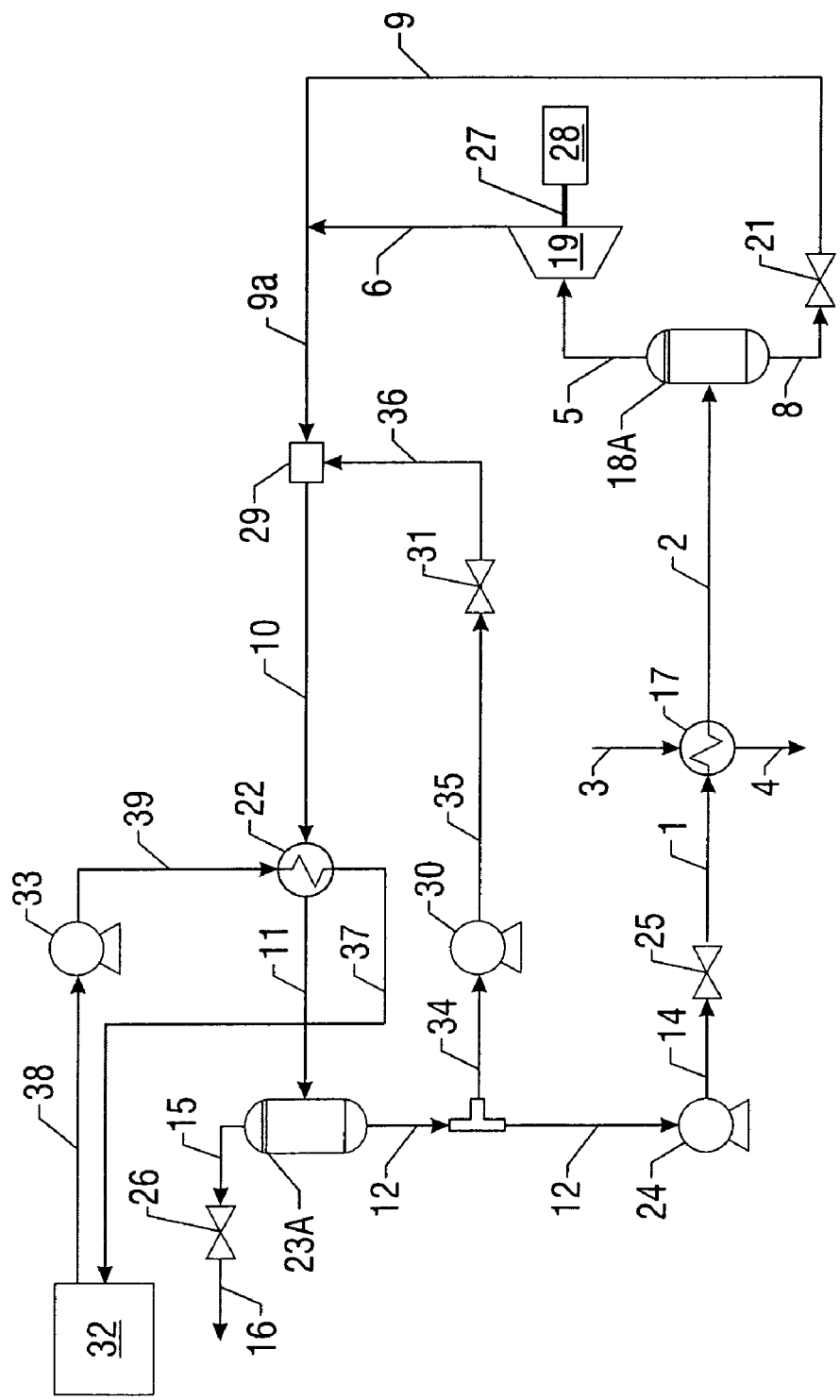
FIG. 3 is a schematic diagram of one embodiment of the present invention wherein a desuperheater is employed to cool working fluid exiting a turbine.

Another illustrative embodiment of the present invention is depicted in FIG. 3. In this embodiment, which is similar to FIGS. 1A-2, the economizer heat exchanger 20 (FIG. 1A) is eliminated and replaced with a desuperheater 29 (FIG. 3), spray pump 30 and valve 31. In the depicted embodiment, the desuperheater 29 is essentially a chamber or area, e.g. a pipe or vessel, where the superheated vapor 6 that exits the turbine 19 may be contacted with a sprayed liquid, e.g., R-123, R-134A, or ammonia (i.e., the working fluid). This embodiment would be employed when there is insufficient heating value available in the turbine discharge 6 to justify the use of the economizer heat exchanger 20 (shown in FIG. 1A). The desuperheater 29 allows the low pressure, high temperature gas (from stream 6) in the combined stream 9A to be desuperheated to the dew point and introduced to the condenser 22. A heat rejection source 32, such as a cooling tower, and a water pump 33 can be utilized for an illustrative water cooled condenser 22. The utilization of an air cooled or evaporative condenser is also possible.

Figure 4:
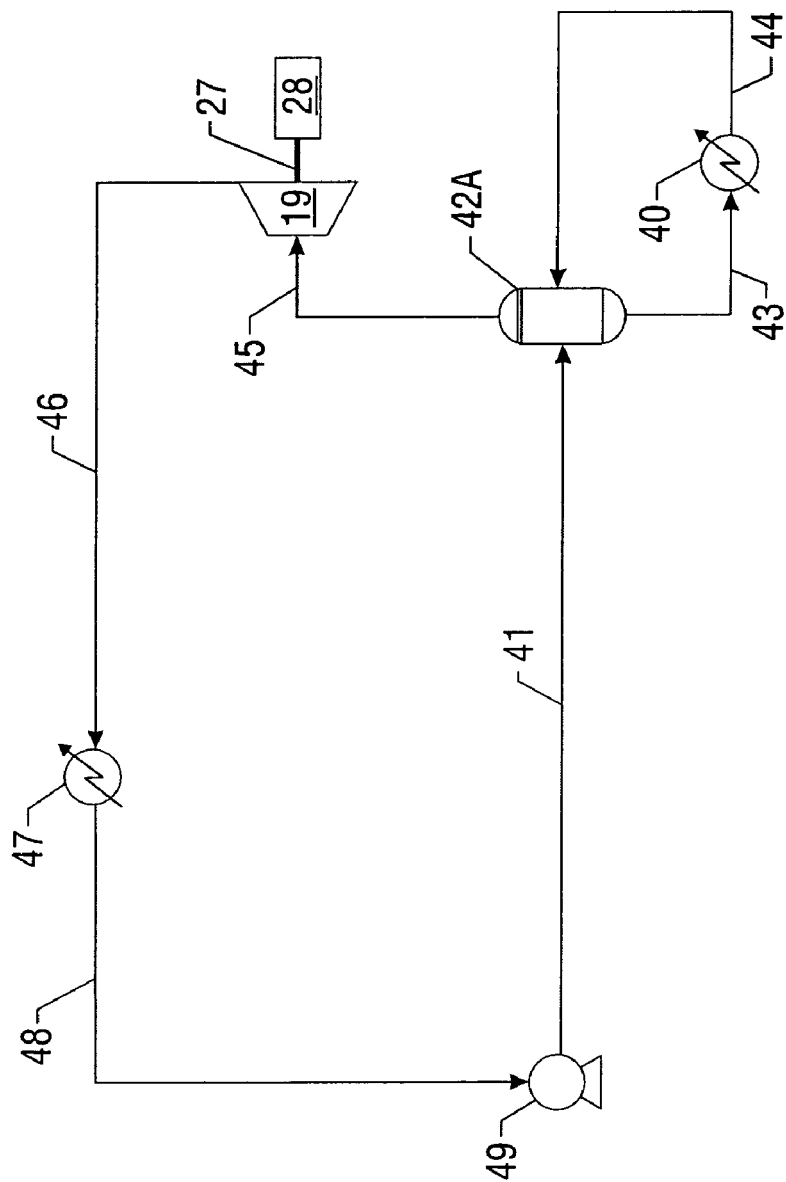
FIG. 4 is a schematic diagram of an embodiment of the present invention wherein the present invention may be employed with a low quality heat source such as solar power, geothermal power or an industrial process.

The present invention may also be employed to recover heat from lower quality heat sources. For example, FIG. 4 depicts another illustrative embodiment of the present invention that may be employed to recover heat from a low temperature source, such as a solar energy system where a working fluid, such as ammonia, is boiled isothermally at a low temperature and high pressure. Because of the smaller pressure ratio allowed in such a circuit due to the small difference between the operating temperature of the heat collector 40 and the condensing temperature, the heat collector 40 is operated as a thermosyphon device. The liquid working fluid 41 enters a drum 42 as a high pressure liquid, e.g., approximately 500–900 psia. The nearly saturated liquid exits the bottom of the drum 42 as liquid stream 43 under pressure supplied by the liquid level in the drum 42 as is dominated by gravitational force. The liquid 43 is partially boiled in the heat collector 40 and returns to the drum 42 as a two-phase vapor via stream 44. The warm liquid from the heat collector 40 falls to the bottom of the drum 42 and mixes with the incoming liquid working fluid 41 preheating the working fluid 41 to near the saturation temperature, e.g., approximately 150–250° F. The warm vapor 45 from the heat collector 40 exits the top of the drum 42 and enters the turbine 19 as a high pressure saturated gas at a temperature ranging from approximately 150–250° F. The drum 42 may contain a demister 42A. The hot vapor 45 expands in the turbine 19 to produce power on a shaft 27 and partially condenses during the expansion process. The power produced at shaft 27 may be utilized to drive a generator 28 or other mechanical device. The low pressure two-phase vapor 46 exiting the turbine 19 is then condensed and slightly subcooled in the condenser 47. This subcooled liquid 48 exiting the condenser 47 is supplied directly to the pump 49 and is pumped to high pressure, e.g., 500–900 psia, as the liquid working fluid 41. The various components depicted in FIG. 4, e.g., pumps, compressors, turbines, drums, condensers, etc., may be similar to those described above wherein such equipment is properly sized and configured to operate in the system depicted in FIG. 4.

Figure 5:
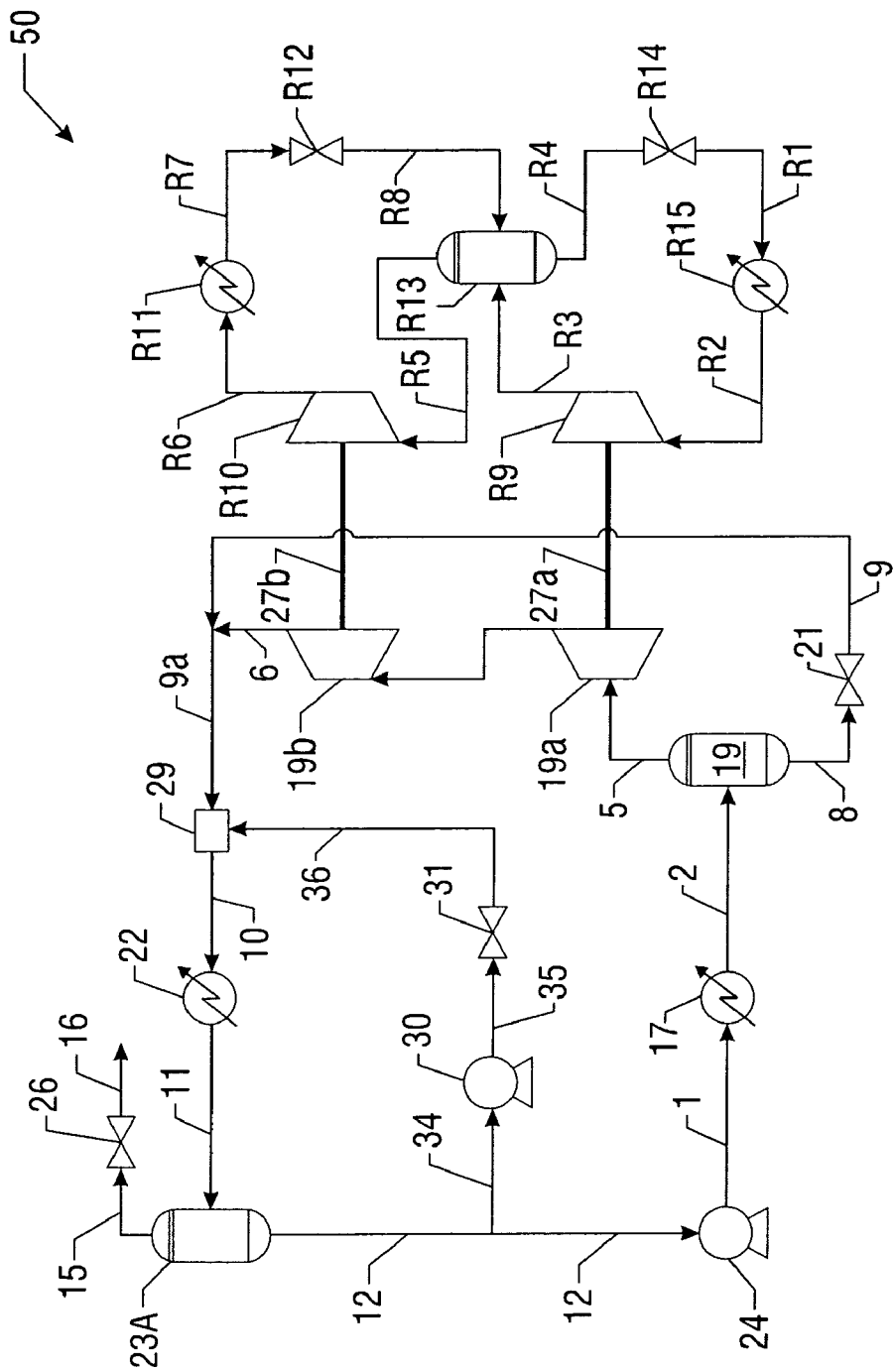
FIG. 5 is a schematic diagram of an illustrative embodiment of the present invention wherein a refrigeration unit and a desuperheater are employed.

The present invention may also be combined with a refrigeration system 50, the output of which may be used for various purposes. FIG. 5 depicts another illustrative embodiment of the present invention wherein a power section substantially similar to FIG. 3 wherein two turbines 19A, 19B and a refrigeration system 50 are added to the power recovery system. The system depicted in FIG. 5 may be designed to only produce refrigeration (i.e., all of the mechanical power drives the compressors R9, R10) or to produce a combination of both refrigeration and electrical power. Turbine 1 (19A) would be mechanically linked to Compressor 1 (R9) either directly or through an intermediate gearbox. Likewise, Turbine 2 (19B) would be mechanically linked to Compressor 2 (R10). Any of a variety of commercially available compressors may be employed with the present invention. The refrigeration load would be applied to the refrigerant evaporator R15. The condenser load would be applied to the refrigerant condenser R11.

In operation, the cold vapor R2, at or near its dewpoint, is supplied to Compressor 1 (R9) where it is compressed to a higher, intermediate pressure. The exhaust R3 from Compressor 1 (R9) is sent to a direct contact heat transfer device, e.g., refrigeration drum R13, which serves both as a separation device and a heat transfer device. This device R13 serves as an intercooler for the intermediate stage of compression and a separator for the second stage of compression. The intermediate vapor R5 from the device R13 is transferred to the inlet of Compressor 2 (R10) and is compressed into to a high pressure gas R6. This heated, high pressure gas is desuperheated and condensed in the refrigerant condenser R11 and exits as a saturated or subcooled liquid R7. This cooled, high pressure liquid is expanded through a high pressure Joule-Thompson expansion valve R12 into a two-phase gas/liquid mixture R8. The expansion process cools the mixture. The expanded mixture R8 is used as the cooling medium in the direct contact heat transfer device R13. Some of the liquid from the expanded mixture R8 flashes to cool the discharge stream R3 from Compressor 1 (R9). The saturated liquid R4 from the heat transfer device R13 is expanded through a second, low pressure Joule-Thompson valve R14. Again, the expansion cools the stream R4 and produces a two-phase gas/liquid mixture R1. This cold, two-phase mixture R1 may then be used for a variety of cooling purposes.

The system depicted in FIG. 5 may also be modified by substituting an economizer heat exchanger 20 (see FIG. 1A) for the desuperheater 29, valve 31 and spray pump 30. That is, the refrigeration system 50 depicted in FIG. 5 (compressors, evaporator, condenser) may be incorporated into the system depicted in FIG. 1A. If the illustrative refrigeration system 50 depicted in FIG. 5 were employed, an additional turbine would need to be incorporated into the system depicted in FIG. 1A. In the alternative, any number of turbines paired with any number of compressors might be utilized. The choice of two turbines and two compressors, as depicted in FIG. 5, is one suggested application of this process. The refrigeration system represented by Compressor 1 (R9), Compressor 2 (R10), refrigerant condenser R11, refrigerant evaporator R15, refrigeration drum R13 and Joule-Thompson valves R12 and R14 may be any of a variety of generic, cascade refrigeration systems that are commonly found in industry.

Figure 6:
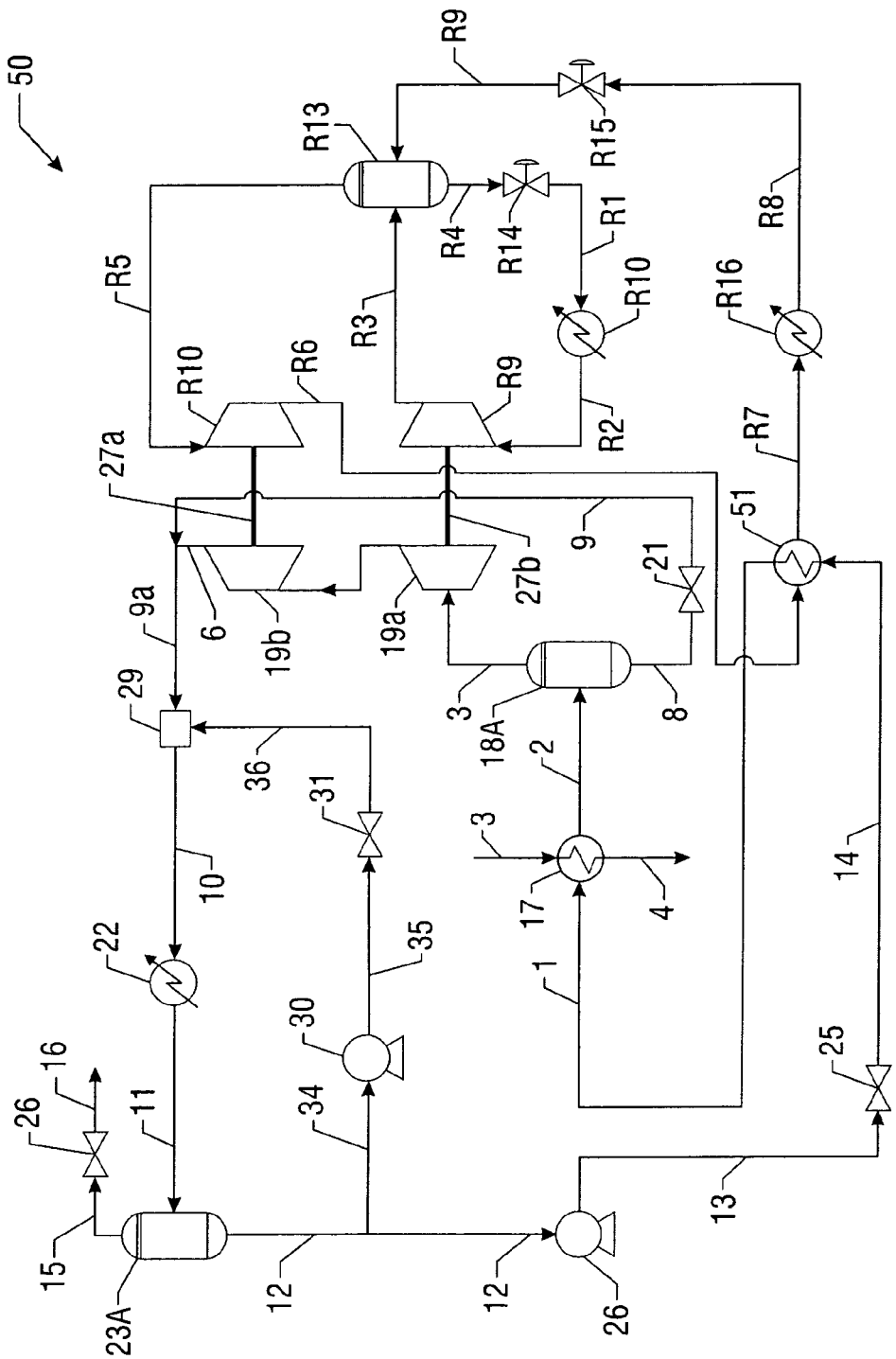
FIG. 6 is a schematic diagram of an embodiment of the present invention involving the use of a refrigeration system, a desuperheater and an economizer/refrigerant condenser.

FIG. 6 depicts another illustrative embodiment of the present invention wherein heat rejected by a refrigeration system 50 is recovered and used to preheat the working fluid of the system. As shown in FIG. 6, a power section substantially similar to FIG. 5 is provided. The refrigerant condenser R11 (FIG. 5) is replaced with a refrigerant condenser/economizer 51 and an optional refrigerant subcooler R16. That is, in this embodiment, heat from the high temperature refrigerant R6 exiting the compressor R10 is used as the heat source to preheat the working fluid 1 prior to it entering the heat exchanger 17. In effect, the refrigerant condenser/economizer 28 is the economizer heat exchanger 20 (depicted in FIG. 1A) wherein the heating fluid used to preheat the working fluid is taken from the refrigeration system 50. This technique substantially increases the output efficiency of this system.

Figure 7A:
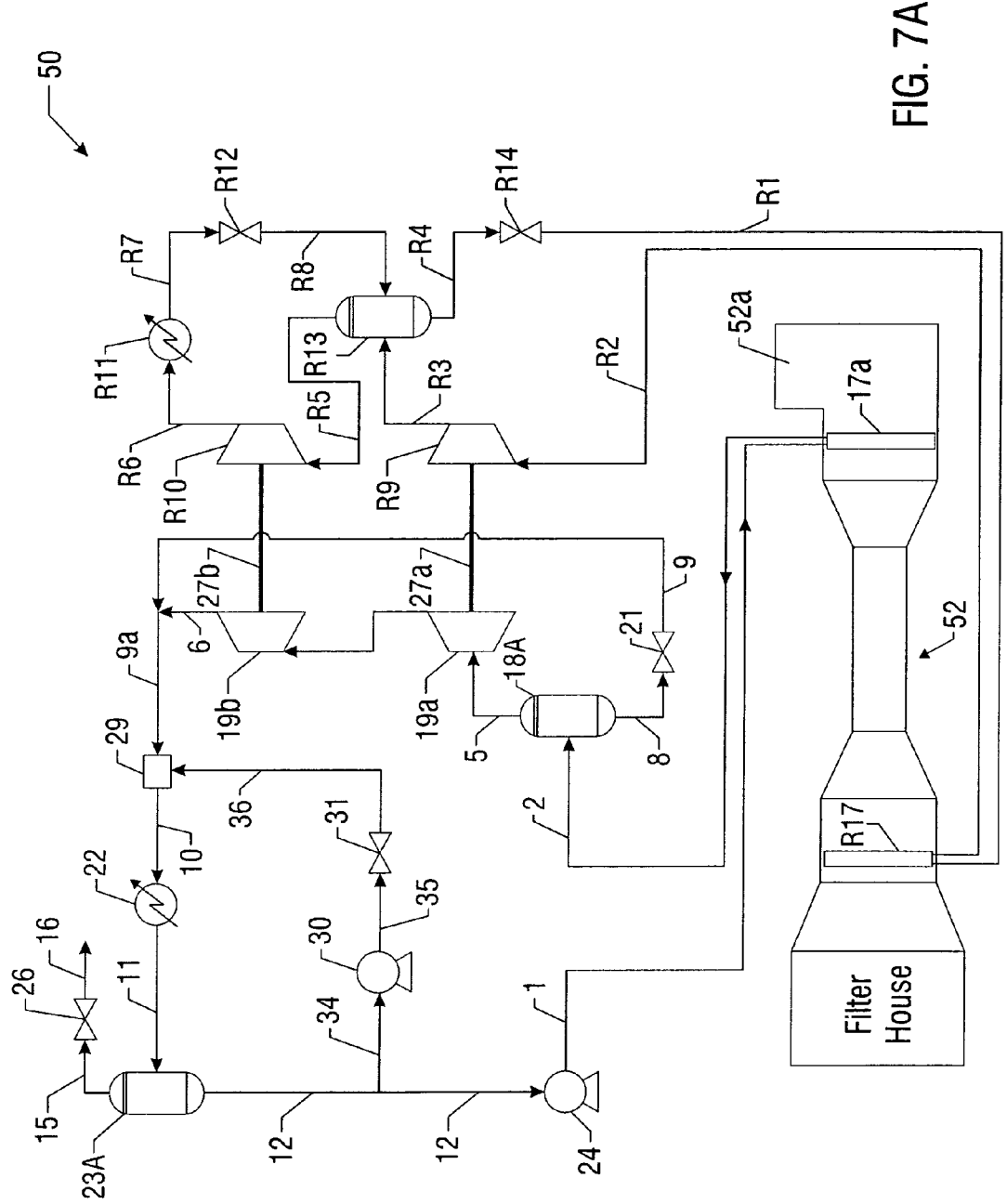
FIG. 7A is a schematic depiction of one illustrative embodiment of the present invention wherein a refrigeration system is employed to chill the inlet air of a gas turbine.

FIG. 7A depicts another illustrative embodiment of the present invention wherein waste heat recovered from a combustion gas turbine 52 is utilized as the heat source for the power system that, in turn, powers a refrigeration system 50 that chills the inlet air to the combustion gas turbine 52. In the depicted embodiment, the inlet air to the gas turbine 52 is chilled by means of an inlet chilling coil R17, i.e., a heat exchanger that evaporates the cold refrigerant R1, which is a cold, two phase mixture of liquid and vapor to thereby chill the air entering the combination gas turbine 52. In one illustrative embodiment, the inlet temperature for the chilling coil R17 may be approximately 32° F. while the exit temperature for the chilling coil R17 may be approximately 50° F. The chilling coil R17 depicted in FIG. 7A may be, for example, a plate-fin-tube coil type heat exchanger. In the alternative, a separation device (not shown) can be utilized between the cold refrigerant R1 and the chilling coil R17 to send only liquid to the inlet chilling coil R17 and to return the vapor, separately to Compressor 1 (R9). In FIG. 7A, the heat exchanger 17A is placed in the exhaust outlet housing 52A of the gas turbine 52, similar to the configuration depicted in FIG. 2. Exhaust gas from the turbine 52 is used to convert the working fluid flowing through the heat exchanger 17A from a liquid state to a vapor state. The illustrative embodiment depicted in FIG. 7A employs a desuperheater 29 (similar to that described above in connection with FIG. 3). However, the system depicted in FIG. 7A could also be employed in a system like that shown in FIG. 1A wherein the economizer heat exchanger 20 is employed and the desuperheater 29, spray pump 30 and valve 31 are eliminated.

Figure 7B:
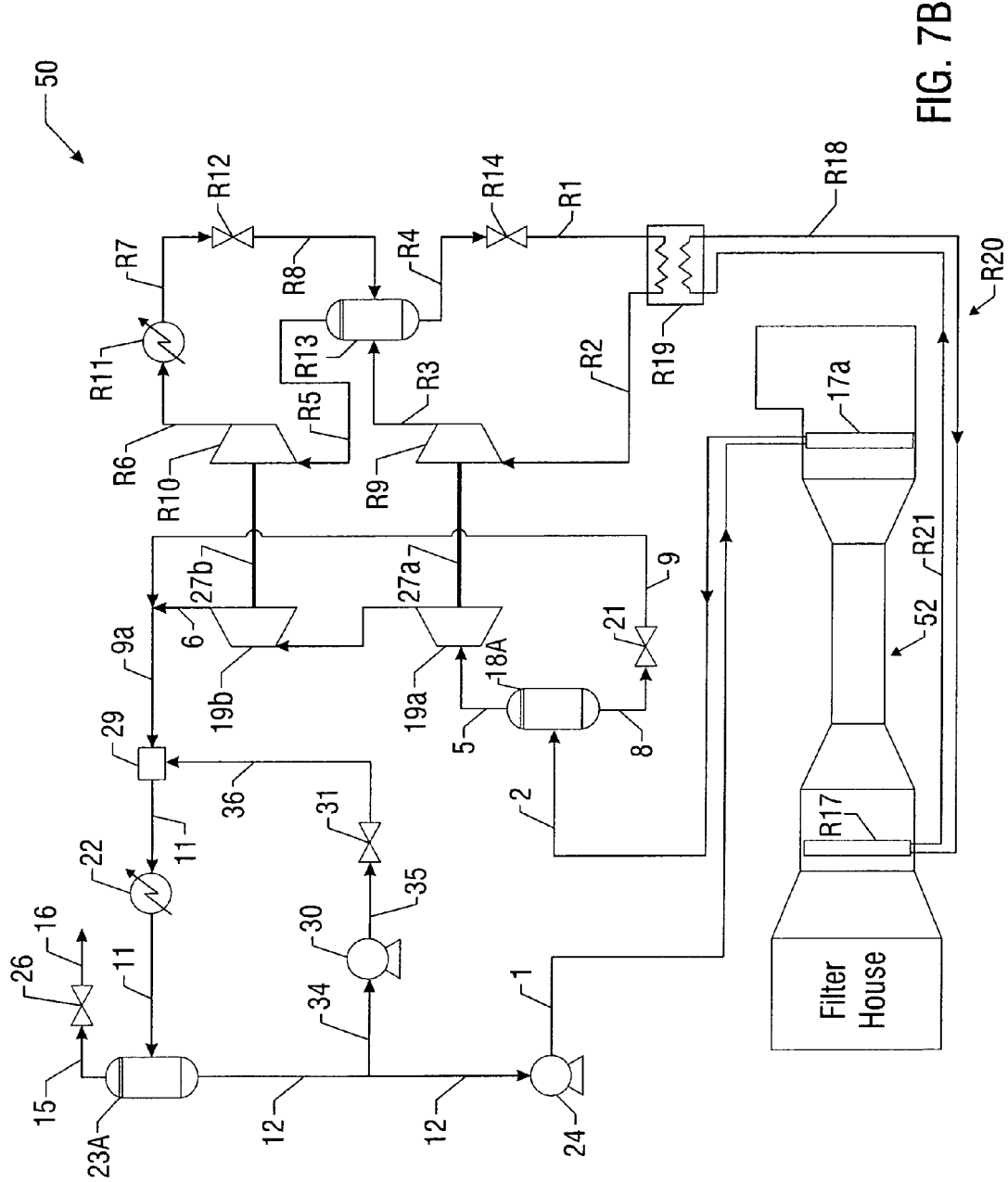
FIG. 7B is a schematic depiction of the illustrative system depicted in FIG. 7A with the addition of an intermediate chilled liquid loop.

FIG. 7B depicts another embodiment of the present invention that is substantially similar to the system depicted in FIG. 7A. In FIG. 7B, an intermediate loop R20 arrangement is utilized to isolate the cold two-phase refrigerant R1 from the inlet chilling coil R17. An intermediate liquid loop R20 and a refrigerant to liquid heat exchanger R19 are utilized to provide chilled liquid to the inlet chilling coil R17. The cold liquid flows into the chilling coil R17 via line R18 and returns via line R21. The working fluid used in the loop R20 may be water, glycol and water, SoCool, Enviro-Kool™, a refrigerant, etc. However, the system depicted in FIG. 7B could also be employed in a system like that shown in FIG. 1A wherein the economizer heat exchanger 20 is employed and the desuperheater 29, spray pump 30 and valve 31 are eliminated.

Figure 7C:
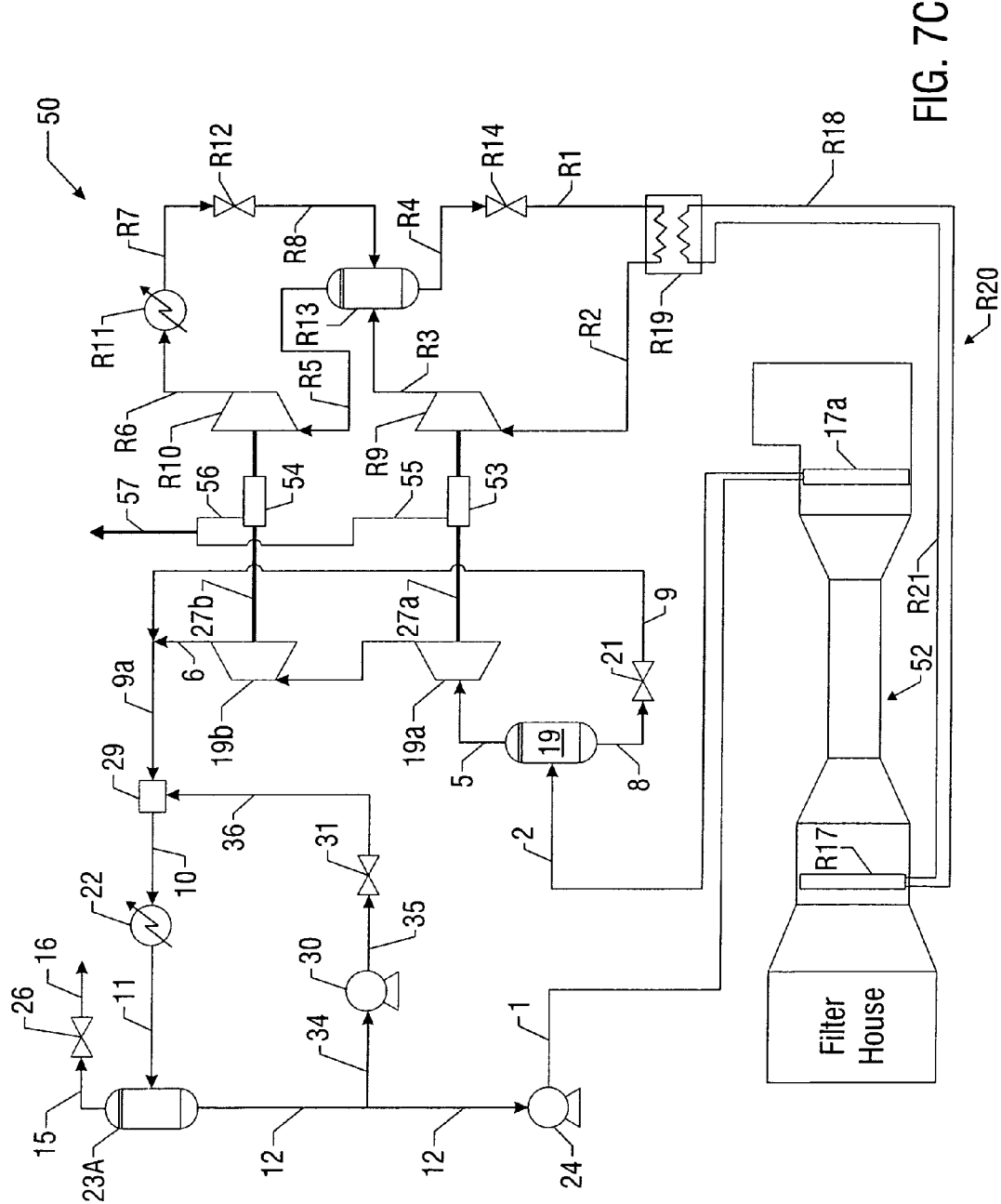
FIG. 7C is a schematic depiction of the system depicted in FIG. 7B with the addition of a plurality of power generators.

FIG. 7C depicts another illustrative embodiment of the present invention that is substantially similar to FIG. 7B. In this embodiment, one or more generators 53, 54 may be attached to the shafts 27A, 27B that couple Turbine 1 (19A) with Compressor 1 (R9) and Turbine 2 (19B) and Compressor 2 (R10). The generators 53, 54 may be connected to the shafts 27A, 27B either directly or through an intermediate gearbox. The electrical power produced from the generators 53, 54 is transferred through a pair of power leads 55, 56 to a main power transmission line 57 for delivery to a power grid. This illustrative embodiment allows the simultaneous generation of both mechanical power (here used to drive a pair of compressors for refrigeration) and electrical power. However, the system depicted in FIG. 7C could also be employed in a system like that shown in FIG. 1A wherein the economizer heat exchanger 20 is employed and the desuperheater 29, spray pump 30 and valve 31 are eliminated.

Figure 8A:
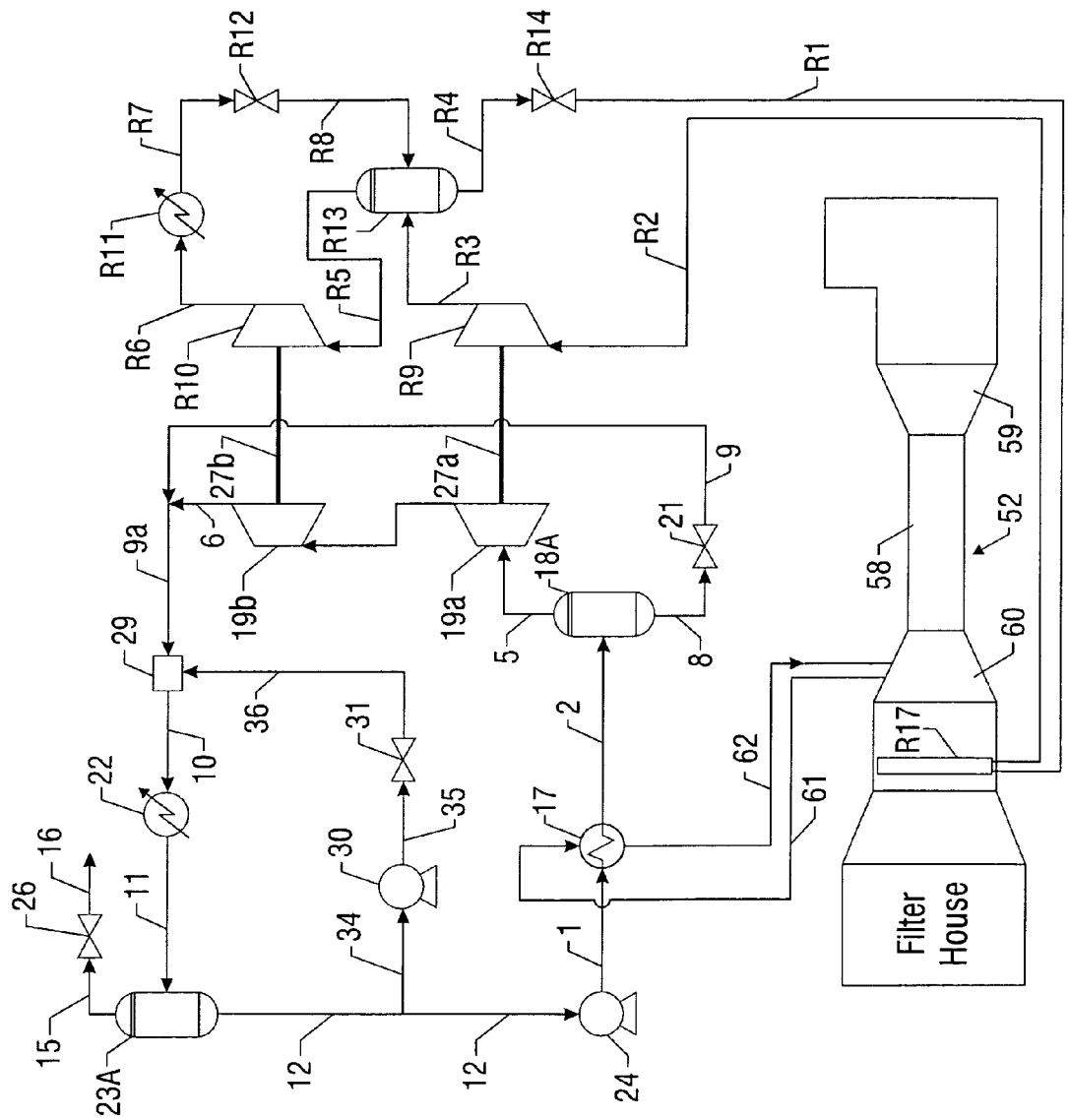
FIG. 8A is a schematic depiction of one embodiment of the present invention which involves use of a refrigeration system and a combustion gas turbine compressor intercooler as the heat source with intercooling and combustion gas turbine inlet air chilling.

The present invention may also be employed in situations when heat is recovered from an intermediate stage of a multi-stage gas compressor used in a combustion gas turbine. In this specific embodiment, the energy recovered would, most effectively, be utilized to cool the inlet gas, thereby increasing the flow capacity of the compressor or reducing the compressor power requirement while reducing the compressor discharge temperature. One illustrative embodiment of such a system is depicted in FIG. 8A, which is substantially similar to FIG. 7A. In the embodiment of FIG. 8A, the heat source is the discharge gas 61 of an intermediate stage of an air compressor (not shown) in the compression section 60 of a combustion gas turbine 52. The heat in this discharged gas 61 is recovered by the heat exchanger 17, and it is used to heat the working fluid of the system. The cooled gas 62 is returned to the next stage of compression in the air compressor. In general, a multi-stage compressor is provided to provide compressed air to the gas turbine 52. The compressed air that is ultimately supplied to the combustion section of the gas turbine 52 is normally subjected to multiple stages of compression at successively higher pressures. The structure and function of such multiple stage compressors are well known to those skilled in the art and, thus, they will not be repeated in any greater detail. FIG. 8C is a schematic depiction of an illustrative examples of the multiple stages of compression of the air for the gas turbine, wherein the pressures $P_1$, $P_2$, $P_3$ and $P_4$ are successively higher pressures. As the air is compressed, the temperature of the air increases. In the system depicted in FIG. 8C, at one or more stages of compression, the compressed air (heated due to compression) is used as the source of heat for the heat exchanger 17 to heat the working fluid 1 to a vapor 2 that is ultimately provided to the turbines 19A, 19B. However, the system depicted in FIG. 8A could also be employed in a system like that shown in FIG. 1A wherein the economizer heat exchanger 20 is employed and the desuperheater 29, spray pump 30 and valve 31 are eliminated.

Figure 8B:
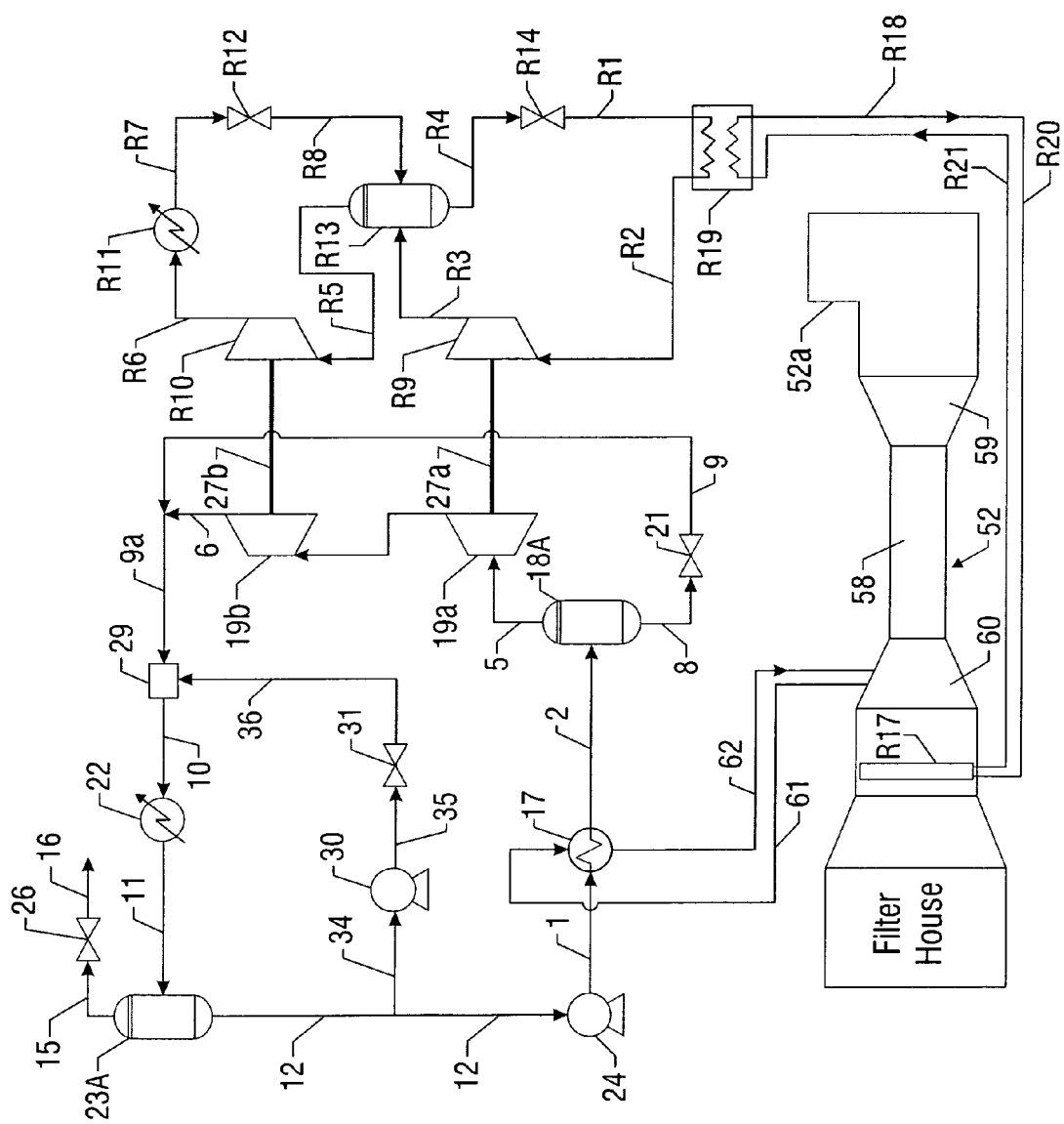
FIG. 8B is a schematic depiction of the system depicted in FIG. 8A with the addition of an intermediate chilled liquid loop.
Figure 8C:
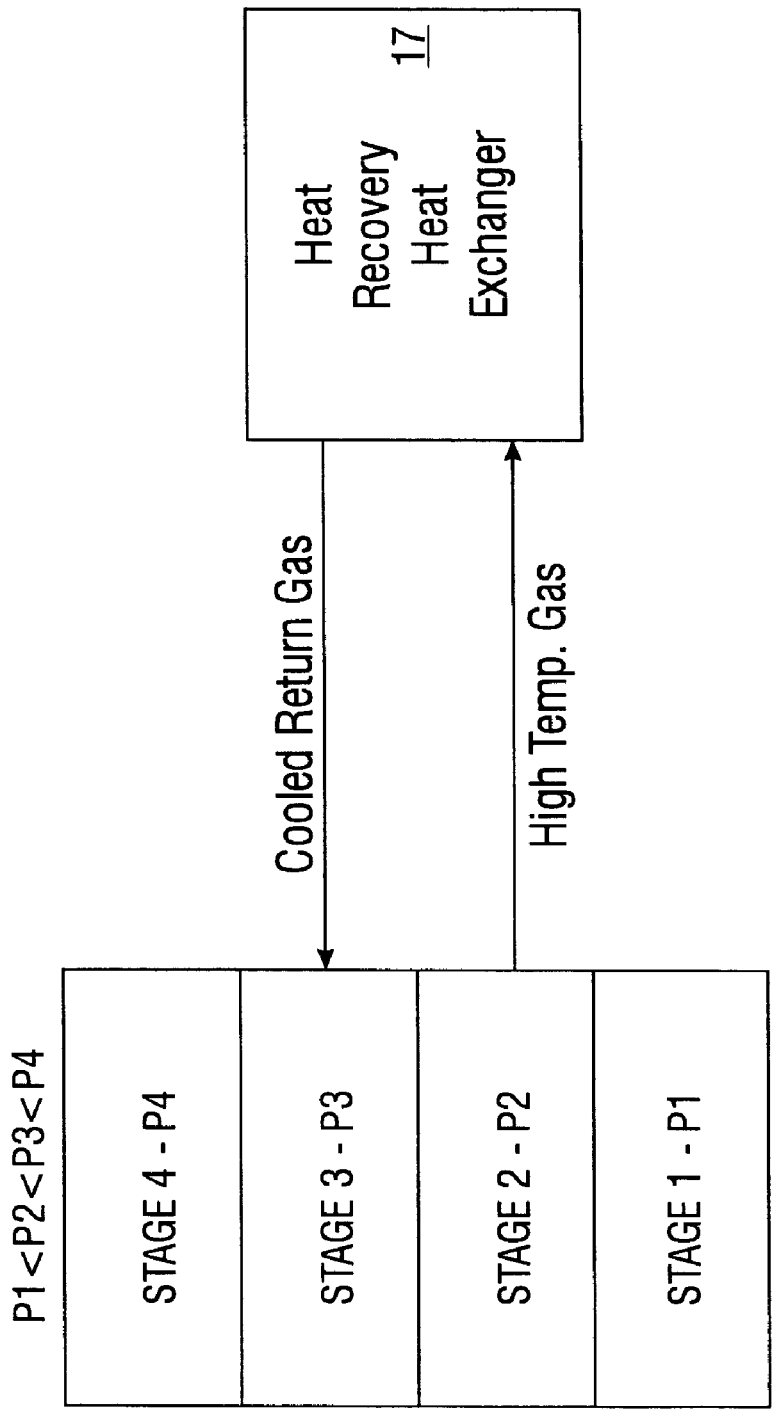
FIG. 8C is a schematic depiction of a multi-stage air compressor of a gas turbine wherein air from an intermediate stage of compression is employed to heat the working fluid in the system.

FIG. 8B depicts another illustrative embodiment of the present invention that is substantially similar to FIG. 7B, wherein the heat source is the discharge gas 61 of an intermediate stage of compression of air in a combustion gas turbine 52 recovered by a heat exchanger 17. The cooled gas 62 is returned to the next stage of compression. This embodiment differs from FIG. 8A in that an intermediate heat exchanger R18 is utilized to isolate the inlet chilling coil R17 from the balance of the refrigeration system, in a manner similar to that described above with reference to FIG. 7B. However, the system depicted in FIG. 8B could also be employed in a system like that shown in FIG. 1A wherein the economizer heat exchanger 20 is employed and the desuperheater 29, spray pump 30 and valve 31 are eliminated.

Figure 9:
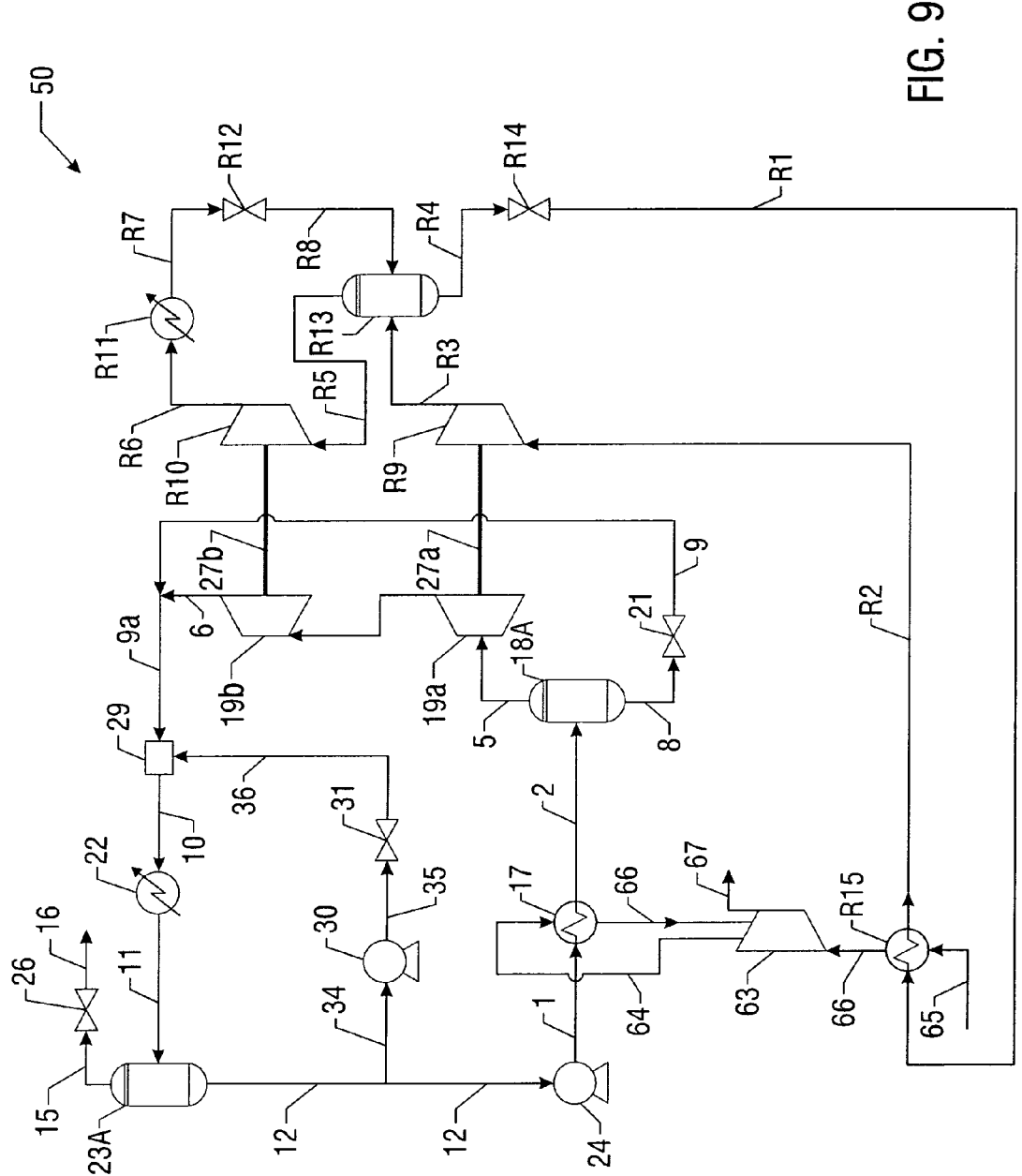
FIG. 9 is a schematic depiction of an embodiment of a system using a refrigeration system and a compressor intercooler as the heat source with intercooling and compressor inlet chilling.

FIG. 9 is another illustrative embodiment of a system in accordance with the present invention. The system depicted in FIG. 9 is substantially similar to the embodiment depicted in FIG. 8B. In FIG. 9, the heat source for heating the working fluid 1 is the discharge gas 64 of an intermediate stage of compression of any compressor 63 compressing any gas or combination of gases 65, the heat of compression of which is recovered by a heat exchanger 17 as the heat input for the process. The cooled gas 66 is returned to the compressor 63. The refrigeration produced is provided to a refrigerant evaporator heat exchanger R15 which is utilized to chill the inlet gas 65 to a reduced temperature, as indicated by the stream 66. Ultimately, the gas is compressed to its final pressure, as indicated by stream 67. Such cooling of the incoming gases may reduce the required power to operate the compressor 63, thereby reducing power consumption, increasing pressure rise, increasing throughput, or a combination of these events. However, the system depicted in FIG. 9 could also be employed in a system like that shown in FIG. 1A wherein the economizer heat exchanger 20 is employed and the desuperheater 29, spray pump 30 and valve 31 are eliminated.

Figure 10:
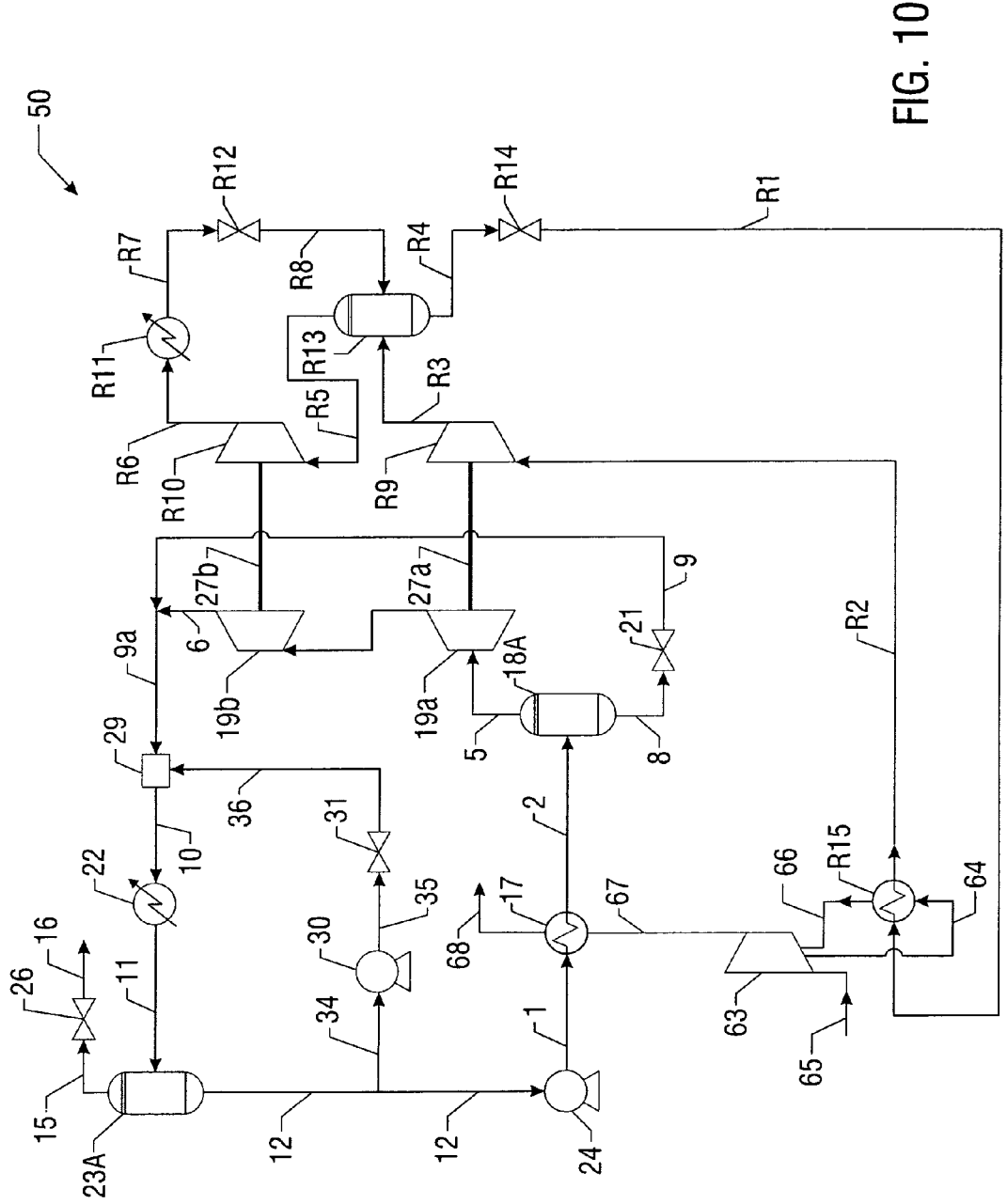
FIG. 10 is a schematic depiction of an embodiment of the present invention using a refrigeration system and a compressor aftercooler as the heat source with intercooling.

FIG. 10 depicts another embodiment of the present invention that is substantially similar to that depicted in FIG. 9. More specifically, in the system depicted in FIG. 10, the source of the hot fluid to heat the working fluid is the discharge gas 67 from the final stage of compression of any compressor 63 that may be used to compress any gas or combination of gases 65. The heat of compression is recovered by a heat exchanger 17 as the heat input for the process. The refrigeration produced is provided to a refrigerant evaporator/intercooler heat exchanger R15 which is utilized to intercool the gas 64 from one or more intermediate stages of the compressor 63 and reduce the required power to operate the compressor 63, thereby reducing power consumption, increasing pressure rise, increasing throughput, or a combination of these events. The cooled gas 66 (after it passes through the heat exchanger R15) is returned to the compressor 63 where it is subjected to further compression within one or more stages of the compressor 63. However, the system depicted in FIG. 10 could also be employed in a system like that shown in FIG. 1A wherein the economizer heat exchanger 20 is employed and the desuperheater 29, spray pump 30 and valve 31 are eliminated.

In one specific embodiment of the present invention, the mechanical power available at the output shaft of the turbine may be utilized directly or through a gearbox to provide mechanical work to drive an electrical power generator to produce electrical power either as a constant voltage and constant frequency AC source or as a DC source which might be rectified to produce AC power at a constant voltage and constant frequency. In another specific embodiment, the mechanical power available at the output shaft of the turbine may be utilized directly or through a gearbox to provide mechanical work to drive any combination of mechanical devices such as a compressor, a pump, a wheel, a propeller, a conveyer, a fan, a gear, or any other mechanical device(s) requiring or accepting mechanical power input. Moreover, the present invention is not restricted to stationary devices, as it may be utilized in or on an automobile, a ship, an aircraft, a spacecraft, a train, or other non-stationary vessel.

A specific byproduct of this method is an effective and dramatic reduction in the emissions of both pollutants and greenhouse gases. This method may not require any fuel nor does it generate any pollutants or greenhouse gases or any other gases as byproducts. Any process to which this method may be applied, such as a gas turbine or a diesel engine, will generate significantly more power with no increase in fuel consumption or pollution. The effect of this method is a net reduction in the specific pollution generation rate on a mass per power produced basis.

In one illustrative embodiment, the present invention is directed to a system comprised of a heat recovery heat exchanger 17 adapted to receive a fluid (liquid or vapor) from a source of waste heat wherein a working fluid 1 is passed through the heat recovery heat exchanger 17 and is converted to vapor via heat transfer from the fluid from waste heat source, a drum 18 adapted to receive the vapor exiting the heat recovery heat exchanger 17, a turbine 19 adapted to receive the vapor exiting the drum 18, and an economizer heat exchanger 20 adapted to receive exhaust vapor 6 from the turbine 19 to heat working fluid provided to the heat recovery heat exchanger 17 via heat transfer with the exhaust vapor 6 from the turbine 19. In some illustrative embodiments, the working fluid may be comprised of a single component or it may be comprised of multiple components. In one particular illustrative embodiment, a refrigerant R-123 may be employed as the working fluid. In various embodiments of the present invention, the vapor that exits the heat recovery heat exchanger 17 may be either a super-critical or sub-critical vapor. Additionally, the fluid (liquid or vapor) used to heat the working fluid in the heat recovery heat exchanger 17 may be provided from a variety of sources, e.g., waste heat from any industrial process, a solar energy source, a cement plant, a manufacturing process, a reciprocating engine, a gas turbine, etc. Such a system provides increased efficiency relative to prior art systems. For example, as stated previously, in one illustrative application, such a system may increase efficiency by approximately 35%. This is due at least in part to the use of the economizer heat exchanger's (20) use of the exhaust fluid 6 from the turbine 19 to preheat the working fluid prior to its introduction into the heat recovery heat exchanger 17. Additionally, the present invention may be useful in reducing the amount of waste heat that is absorbed by the environment, as a portion of the exhaust fluid 6 from the turbine 19 is used in preheating the working fluid prior to its introduction into the heat recovery heat exchanger 17. Due to this reduction in the amount of waste heat, the size of other equipment, such as the condenser 22 depicted in FIG. 1A, may be reduced. Thus, the present invention may be useful in reducing the amount of heat exhausted to the environment, reducing the size of some of the equipment employed in such systems and/or increase the overall operating efficiency of such a system.

In another illustrative embodiment, the present invention is directed to a method that comprises the steps of increasing a temperature of a working fluid in the heat exchanger 20 from a first temperature to a second temperature by transferring heat from an exhaust fluid 6 of a turbine 19, introducing the working fluid at the second temperature into the heat exchanger 17 wherein the working fluid is converted to a vapor by transferring heat from a fluid from a waste heat source, and introducing the vapor exiting the heat exchanger 17 into a drum 18 and introducing vapor 5 exiting the drum 18 into an inlet of the turbine 19.

In another illustrative embodiment, the present invention is directed to a method that comprises the steps of increasing the temperature of a working fluid in the heat exchanger 20 from a first temperature to a second temperature by transferring heat from an exhaust fluid 6 of a turbine 19, introducing the working fluid at the second temperature into the heat exchanger 17 wherein the working fluid is converted to a vapor by transferring heat from a fluid from a waste heat source, and introducing the vapor 5 into an inlet of the turbine 19.

The present invention is generally directed to various systems and methods for producing mechanical power from a heat source. In various illustrative examples, the devices employed in practicing the present invention may include a heat recovery heat exchanger, a turbine, an economizer heat exchanger, a condenser heat exchanger, and a liquid circulating pump, etc. In one illustrative embodiment, the system comprises a first heat exchanger adapted to receive a fluid from a heat source and a working fluid, wherein, when the working fluid is passed through the first heat exchanger, the working fluid is converted to a vapor via heat transfer from the heat contained in the fluid from the heat source, at least one turbine adapted to receive the vapor, and an economizer heat exchanger adapted to receive exhaust vapor from the turbine and the working fluid, wherein a temperature of the working fluid is adapted to be increased via heat transfer with the exhaust vapor from the turbine prior to the introduction of the working fluid into the first heat exchanger. The system further comprises a condenser heat exchanger that is adapted to receive the exhaust vapor from the turbine after the exhaust vapor has passed through the economizer heat exchanger and a cooling fluid, wherein a temperature of the exhaust vapor is reduced via heat transfer with the cooling fluid, and a pump that is adapted to circulate the working fluid to the economizer heat exchanger.

In another illustrative embodiment, the system comprises a first heat exchanger adapted to receive a fluid from a heat source and a working fluid, wherein, when the working fluid is passed through the first heat exchanger, the working fluid is converted to a vapor via heat transfer from the heat contained in the fluid from the heat source, and at least one turbine adapted to receive the vapor. The system further comprises a desuperheater heat exchanger adapted to receive exhaust vapor from the turbine and a portion of the working fluid extracted upstream of the first heat exchanger, wherein the temperature of the exhaust vapor from the turbine is adapted to be reduced via heat transfer with the working fluid in the desuperheater heat exchanger, a condenser heat exchanger that is adapted to receive working fluid exiting the desuperheater heat exchanger and a cooling fluid, wherein a temperature of the working fluid is adapted to be reduced via heat transfer with the cooling fluid in the condenser heat exchanger, and a pump adapted to circulate the working fluid to the first heat exchanger.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
a first heat exchanger adapted to receive a fluid from a heat source and a working fluid, wherein, when the working fluid is passed through the first heat exchanger, the working fluid is converted to a supercritical vapor via heat transfer from the heat contained in said fluid from said heat source, wherein a temperature-enthalpy profile of said working fluid in the first heat exchanger is approximately linear as the working fluid changes state from a liquid to a supercritical vapor;
at least one turbine adapted to receive said vapor and adapted to drive at least one generator to thereby produce electrical power;
an economizer heat exchanger adapted to receive exhaust vapor from said at least one turbine and said working fluid, wherein a temperature of the working fluid is adapted to be increased via heat transfer with said exhaust vapor from said at least one turbine prior to the introduction of said working fluid into said first heat exchanger;
a condenser heat exchanger that is adapted to receive said exhaust vapor from said at least one turbine after said exhaust vapor has passed through said economizer heat exchanger and a cooling fluid, wherein a temperature of said exhaust vapor is reduced via heat transfer with said cooling fluid; and
a pump that is adapted to circulate said working fluid to said economizer heat exchanger.

2. The system of claim 1 further comprising a desuperheater heat exchanger that is adapted to decrease the temperature of the exhaust vapor from said at least one turbine via direct contact heat transfer with said exhaust vapor from the at least one turbine prior to introduction of said exhaust vapor into said condenser heat exchanger.

3. The system of claim 1 wherein said working fluid is a single component other than water.

4. The system of claim 1 wherein said working fluid is a combination of multiple components, none of which is water.

5. The system of claim 1, wherein said working fluid is HCFC-123.

6. The system of claim 1, wherein said working fluid is HFC-134a.

7. The system of claim 1 wherein said fluid from said heat source is an exhaust fluid from a combustion gas turbine.

8. The system of claim 1 wherein said fluid from said heat source is a fluid from at least one of an industrial process and a manufacturing process.

9. The system of claim 1 wherein said fluid from said heat source is an exhaust fluid from an internal combustion engine.

10. The system of claim 1 wherein said fluid from said heat source is a fluid that is extracted from an intermediate stage of compression of a multi-stage gas compressor.

11. The system of claim 1 wherein said fluid from said heat source is a compressed gas that has exited a final stage of compression in a multi-stage compressor.

12. The system of claim 1 wherein the electrical power generated is utilized in part or in full to drive at least one electrically powered refrigeration device.

13. The system of claim 1, further comprising a suction drum positioned downstream of said first heat exchanger and upstream of said turbine, said supercritical vapor from said first heat exchanger being adapted to flow through said suction drum to said turbine.

14. The system of claim 1, wherein said fluid from said heat source is a fluid that is extracted from an intermediate stage of compression of a multi-stage gas compressor of a combustion gas turbine, and wherein said at least one turbine is adapted to drive at least one compressor of a refrigeration system to thereby produce refrigeration which is utilized to chill air entering the combustion gas turbine.

15. The system of claim 1 wherein the working fluid is HCFC-123 and said fluid from said heat source has a temperature of between approximately 350° F. and 1500° F.

16. The system of claim 15 wherein said pump is adapted to operate at a pressure greater than approximately 200 psig.

17. The system of claim 15 wherein said condenser heat exchanger is adapted to condense the exhaust vapor from said at least one turbine to a liquid at a temperature between approximately 50° F. and 200° F.

18. The system of claim 1 wherein the working fluid is HFC-134a and said fluid from said heat source has a temperature of between approximately 250° F. and 1100° F.

19. The system of claim 18 wherein said pump is adapted to operate at a pressure greater than approximately 320 psig.

20. The system of claim 18 wherein said condenser heat exchanger is adapted to condense the exhaust vapor from said at least one turbine to a liquid at a temperature between approximately 50° F. and 170° F.

21. The system of claim 1 wherein the working fluid is ammonia and said fluid from said heat source has a temperature less than approximately 400° F.

22. The system of claim 21 wherein said pump is adapted to operate at a pressure greater than approximately 220 psig.

23. The system of claim 21 wherein said condenser heat exchanger is utilized to condense said exhaust vapor from said at least one turbine to a liquid at a temperature between approximately 50° F. and 160° F.

24. A system, comprising:
a first heat exchanger adapted to receive a fluid from a heat source and a working fluid, wherein, when the working fluid is passed through the first heat exchanger, the working fluid is converted to a vapor via heat transfer from the heat contained in said fluid from said heat source;
at least one turbine adapted to receive said vapor and to drive at least one compressor of a refrigeration system to thereby produce refrigeration, which may be utilized to chill the air entering a combustion gas turbine or to provide refrigeration to any other industrial, commercial, or residential refrigeration demand;
an economizer heat exchanger adapted to receive exhaust vapor from said at least one turbine and said working fluid, wherein a temperature of the working fluid is adapted to be increased via heat transfer with said exhaust vapor from said at least one turbine prior to the introduction of said working fluid into said first heat exchanger;
a condenser heat exchanger that is adapted to receive said exhaust vapor from said at least one turbine after said exhaust vapor has passed through said economizer heat exchanger and a cooling fluid, wherein a temperature of said exhaust vapor is reduced via heat transfer with said cooling fluid; and
a pump that is adapted to circulate said working fluid to said economizer heat exchanger.

25. The system of claim 24 wherein said at least one turbine is further adapted to drive at least one generator to thereby produce electrical power.

26. The system of claim 25 wherein the electrical power generated is utilized in part or in full to drive at least one electrically powered refrigeration device.

27. A system, comprising:
a first heat exchanger adapted to receive an exhaust fluid from a combustion gas turbine and a working fluid, wherein, when the working fluid is passed through the first heat exchanger, the working fluid is converted to a vapor via heat transfer from the heat contained in said exhaust fluid from said combustion gas turbine;
at least one turbine adapted to receive said vapor and to drive at least one compressor of a refrigeration system to thereby produce refrigeration to chill air entering said combustion gas turbine;
an economizer heat exchanger adapted to receive exhaust vapor from said at least one turbine and said working fluid, wherein a temperature of the working fluid is adapted to be increased via heat transfer with said exhaust vapor from said at least one turbine prior to the introduction of said working fluid into said first heat exchanger;
a condenser heat exchanger that is adapted to receive said exhaust vapor from said at least one turbine after said exhaust vapor has passed through said economizer heat exchanger and a cooling fluid, wherein a temperature of said exhaust vapor is reduced via heat transfer with said cooling fluid; and
a pump that is adapted to circulate said working fluid to said economizer heat exchanger.

28. The system of claim 27 wherein said at least one turbine is adapted to utilize at least one intermediate heat exchanger adapted to receive a cold refrigerant liquid and exhaust a warm refrigerant vapor while cooling an intermediate operating fluid utilized in a heat exchanger adapted to receive said intermediate media and provide cooling for the air entering the turbine.

29. The system of claim 27 wherein said at least one turbine is adapted to utilize at least one intermediate refrigeration heat exchanger adapted to receive a cold refrigerant liquid and exhaust a warm refrigerant vapor while cooling an intermediate operating fluid utilized in a heat exchanger adapted to receive said intermediate media and provide cooling for the air entering the combustion gas turbine and at least some fraction of the work produced by the turbine is used to produce electrical power.

30. A system, comprising:
a first heat exchanger adapted to receive an exhaust fluid from a combustion gas turbine and a working fluid, wherein, when the working fluid is passed through the first heat exchanger, the working fluid is converted to a vapor via heat transfer from the heat contained in said exhaust fluid from said combustion gas turbine;
at least one turbine adapted to receive said vapor and to drive at least one compressor of a refrigeration system to thereby produce refrigeration to chill air entering said combustion as turbine;
a desuperheater heat exchanger adapted to receive exhaust vapor from said at least one turbine and a portion of the working fluid extracted upstream of the first heat exchanger, wherein the temperature of the exhaust vapor from the at least one turbine is adapted to be reduced via heat transfer by direct contact and mixing with said working fluid in said desuperheater heat exchanger;
a condenser heat exchanger that is adapted to receive working fluid exiting said desuperheater heat exchanger and a cooling fluid, wherein a temperature of said working fluid is adapted to be reduced via heat transfer with said cooling fluid in said condenser heat exchanger; and
a pump adapted to circulate said working fluid to said first heat exchanger.

31. The system of claim 30 wherein said at least one turbine is adapted to utilize at least one intermediate refrigeration heat exchanger adapted to receive the cooled working fluid and exhaust a warm refrigerant vapor while cooling an intermediate operating fluid utilized in a heat exchanger adapted to receive said intermediate operating fluid and provide cooling for the air entering the turbine.

32. The system of claim 30 wherein said at least one turbine is adapted to utilize at least one intermediate refrigeration heat exchanger adapted to receive the cooled working fluid and exhaust a war refrigerant vapor while cooling an intermediate operating fluid utilized in a heat exchanger adapted to receive said intermediate operating fluid and provide cooling for the air entering the combustion gas turbine and at least some fraction of the work produced by the turbine is used to produce electrical power.

33. A system, comprising:
a first heat exchanger adapted to receive a fluid extracted from an intermediate stage of compression of a multi-stage gas compressor of a combustion gas turbine and a working fluid, wherein, when the working fluid is passed through the first heat exchanger, the working fluid is converted to a vapor via heat transfer from the heat contained in said fluid extracted from said intermediate stage of compression;
at least one turbine adapted to receive said vapor and to drive at least one compressor of a refrigeration system to thereby produce refrigeration which is utilized to chill air entering said combustion gas turbine;
an economizer heat exchanger adapted to receive exhaust vapor from said at least one turbine and said working fluid, wherein a temperature of the working fluid is adapted to be increased via heat transfer with said exhaust vapor from said at least one turbine prior to the introduction of said working fluid into said first heat exchanger;
a condenser heat exchanger that is adapted to receive said exhaust vapor from said at least one turbine after said exhaust vapor has passed through said economizer heat exchanger and a cooling fluid, wherein a temperature of said exhaust vapor is reduced via heat transfer with said cooling fluid; and
a pump that is adapted to circulate said working fluid to said economizer heat exchanger.

34. The system of claim 33 wherein said at least one turbine is adapted to utilize at least one intermediate refrigeration heat exchanger adapted to receive the cooled working fluid and exhaust a warm refrigerant vapor while cooling an intermediate operating fluid utilized in a heat exchanger adapted to receive said intermediate operating fluid and provide cooling for the air entering the turbine.

35. A system, comprising:
a first heat exchanger adapted to receive a fluid extracted from an intermediate stage of compression of a multi-stage gas compressor of a combustion gas turbine and a working fluid, wherein, when the working fluid is passed through the first heat exchanger, the working fluid is converted to a vapor via heat transfer from the heat contained in said fluid extracted from said intermediate stage of compression;
at least one turbine adapted to receive said vapor and to drive at least one compressor of a refrigeration system to thereby produce refrigeration which is utilized to chill air entering said combustion gas turbine;

a desuperheater heat exchanger adapted to receive exhaust vapor from said at least one turbine and a portion of the working fluid extracted upstream of the first heat exchanger, wherein the temperature of the exhaust vapor from the at least one turbine is adapted to be reduced via heat transfer by direct contact and mixing with said working fluid in said desuperheater heat exchanger;

a condenser heat exchanger that is adapted to receive working fluid exiting said desuperheater heat exchanger and a cooling fluid, wherein a temperature of said working fluid is adapted to be reduced via heat transfer with said cooling fluid in said condenser heat exchanger; and a pump adapted to circulate said working fluid to said first heat exchanger.

36. The system of claim 35 wherein said at least one turbine is adapted to utilize at least one intermediate refrigeration heat exchanger adapted to receive the cooled working fluid and exhaust a warm refrigerant vapor while cooling an intermediate operating fluid utilized in a heat exchanger adapted to receive said intermediate operating fluid and provide cooling for the air entering the turbine.

37. A system, comprising:

a first heat exchanger adapted to receive a superheated vapor from a high pressure stage of a refrigeration system that is utilized exclusively for the purpose of replacing a condenser in the refrigeration system and a working fluid, wherein, when the working fluid is passed through the first heat exchanger, the working fluid is converted to a vapor via heat transfer from the heat contained in said fluid from said heat source;

at least one turbine adapted to receive said vapor;

a desuperheater heat exchanger adapted to receive exhaust vapor from said at least one turbine and a portion of the working fluid extracted upstream of the first heat exchanger, wherein the temperature of the exhaust vapor from the at least one turbine is adapted to be reduced via heat transfer by direct contact and mixing with said working fluid in said desuperheater heat exchanger;

a condenser heat exchanger that is adapted to receive working fluid exiting said desuperheater heat exchanger and a cooling fluid, wherein a temperature of said working fluid is adapted to be reduced via heat transfer with said cooling fluid in said condenser heat exchanger; and a pump adapted to circulate said working fluid to said first heat exchanger.

* * * * *